United States Patent
Ichiki

(10) Patent No.: US 12,158,520 B2
(45) Date of Patent: Dec. 3, 2024

(54) SIGNAL PROCESSING DEVICE, SIGNAL PROCESSING METHOD, AND INFORMATION PROCESSING DEVICE

(71) Applicant: SONY SEMICONDUCTOR SOLUTIONS CORPORATION, Kanagawa (JP)

(72) Inventor: Hiroshi Ichiki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 551 days.

(21) Appl. No.: 17/440,458

(22) PCT Filed: Mar. 16, 2020

(86) PCT No.: PCT/JP2020/011360
§ 371 (c)(1),
(2) Date: Sep. 17, 2021

(87) PCT Pub. No.: WO2020/196003
PCT Pub. Date: Oct. 1, 2020

(65) Prior Publication Data
US 2022/0146664 A1  May 12, 2022

(30) Foreign Application Priority Data
Mar. 28, 2019  (JP) ................................ 2019-062506

(51) Int. Cl.
*G01S 13/931* (2020.01)
*G01S 7/40* (2006.01)
*G01S 13/58* (2006.01)

(52) U.S. Cl.
CPC ............ *G01S 13/931* (2013.01); *G01S 7/403* (2021.05); *G01S 13/584* (2013.01); *G01S 2013/932* (2020.01); *G01S 2013/9329* (2020.01)

(58) Field of Classification Search
CPC ...... G01S 13/931; G01S 7/403; G01S 13/584; G01S 2013/932; G01S 2013/9329
(Continued)

(56) References Cited

U.S. PATENT DOCUMENTS 5,027,122 A * 6/1991 Wieler ................... G01S 13/227
342/26 D
5,506,582 A * 4/1996 Lawsine ................... G01S 7/38
342/15

(Continued)

FOREIGN PATENT DOCUMENTS

EP         447159 A2    9/1991
EP       2607922 A1 *  6/2013 ............. G01S 13/92
(Continued)

OTHER PUBLICATIONS

International Search Report and Written Opinion of PCT Application No. PCT/JP2020/011360, issued on Jun. 9, 2020, 09 pages of ISRWO.

*Primary Examiner* — Nuzhat Pervin
(74) *Attorney, Agent, or Firm* — CHIP LAW GROUP

(57) ABSTRACT

The present technology relates to a signal processing device, a signal processing method, a program, and an information processing device capable of reducing processing of folding correction of velocity measured by a radar.
The signal processing device includes a measurement unit that measures, on the basis of an output signal from a radar, a distance and relative velocity of a reflector that reflects a transmission signal from the radar, and a correction unit that performs folding correction of measured velocity of the (Continued)

reflector on the basis of correlation between a measured distance and measured velocity of the reflector at a certain measurement time, and a measured distance and measured velocity of the reflector at a time before the measurement time. The present technology can be applied to, for example, a system that senses an object around a vehicle.

19 Claims, 15 Drawing Sheets

(58) Field of Classification Search
USPC .......................................................... 342/70
See application file for complete search history.

(56) References Cited

U.S. PATENT DOCUMENTS

| | | | | |
|---|---|---|---|---|
| 6,587,074 | B1* | 7/2003 | Winter | G01S 13/931 |
| | | | | 342/128 |
| 7,209,221 | B2* | 4/2007 | Breed | G01S 7/417 |
| | | | | 356/28 |
| 7,852,462 | B2* | 12/2010 | Breed | B60W 30/095 |
| | | | | 356/28 |
| 7,893,868 | B2* | 2/2011 | Akita | G01S 7/023 |
| | | | | 342/111 |
| 8,179,303 | B2* | 5/2012 | Kishida | G01S 13/42 |
| | | | | 342/107 |
| 8,879,050 | B2* | 11/2014 | Ko | G01S 17/894 |
| | | | | 356/3.01 |
| 9,007,197 | B2* | 4/2015 | Breed | G01S 17/08 |
| | | | | 340/436 |
| 10,275,797 | B2* | 4/2019 | Freytag | G05D 1/247 |
| 10,336,190 | B2* | 7/2019 | Yokochi | B60K 35/00 |
| 10,496,889 | B2* | 12/2019 | Ishii | B60W 60/0055 |
| 10,782,699 | B2* | 9/2020 | Tao | G05D 1/0088 |
| 10,871,557 | B2* | 12/2020 | Takayama | G01S 13/931 |
| 10,875,541 | B2* | 12/2020 | Takeda | B62D 6/00 |
| 10,957,029 | B2* | 3/2021 | Ichihashi | G06T 3/18 |
| 10,962,638 | B2* | 3/2021 | Duque Biarge | G06T 17/05 |
| 11,214,244 | B2* | 1/2022 | Kwon | B60T 8/17558 |
| 11,402,836 | B2* | 8/2022 | Takemura | G05D 1/0027 |
| 11,467,595 | B2* | 10/2022 | Templeton | G01S 7/4865 |
| 11,513,531 | B2* | 11/2022 | Kim | B60W 60/0025 |
| 2003/0122702 | A1* | 7/2003 | Kishida | G01S 13/931 |
| | | | | 342/72 |
| 2004/0174292 | A1* | 9/2004 | Isaji | G01S 13/584 |
| | | | | 342/107 |
| 2005/0195383 | A1* | 9/2005 | Breed | B60R 22/26 |
| | | | | 356/28 |
| 2007/0182528 | A1* | 8/2007 | Breed | B60W 30/16 |
| | | | | 348/148 |
| 2008/0085686 | A1* | 4/2008 | Kalik | G01S 13/931 |
| | | | | 455/154.1 |
| 2008/0150786 | A1* | 6/2008 | Breed | B60W 30/04 |
| | | | | 342/53 |
| 2008/0154495 | A1* | 6/2008 | Breed | G01C 21/20 |
| | | | | 701/472 |
| 2008/0165018 | A1* | 7/2008 | Breed | G08G 1/161 |
| | | | | 340/463 |
| 2009/0030605 | A1* | 1/2009 | Breed | B60W 30/18154 |
| | | | | 340/901 |
| 2009/0140887 | A1* | 6/2009 | Breed | G01C 21/1656 |
| | | | | 701/116 |
| 2010/0033364 | A1* | 2/2010 | Kishida | G01S 13/584 |
| | | | | 342/70 |
| 2010/0033365 | A1* | 2/2010 | Kishida | G01S 13/42 |
| | | | | 342/146 |
| 2011/0001656 | A1* | 1/2011 | Nakai | G01S 3/74 |
| | | | | 342/99 |
| 2012/0242530 | A1* | 9/2012 | Luebbert | G01S 13/48 |
| | | | | 342/70 |
| 2013/0162462 | A1* | 6/2013 | Lehning | G08G 1/052 |
| | | | | 342/104 |
| 2013/0176162 | A1* | 7/2013 | Vincent | G01S 13/589 |
| | | | | 342/107 |
| 2014/0104051 | A1* | 4/2014 | Breed | G08G 1/09626 |
| | | | | 340/435 |
| 2015/0185316 | A1* | 7/2015 | Rao | G01S 13/931 |
| | | | | 342/146 |
| 2015/0285904 | A1* | 10/2015 | Rao | G01S 13/06 |
| | | | | 342/146 |
| 2016/0124086 | A1* | 5/2016 | Jansen | G01S 13/931 |
| | | | | 342/107 |
| 2016/0157828 | A1* | 6/2016 | Sumi | G01N 29/46 |
| | | | | 702/189 |
| 2017/0082744 | A1* | 3/2017 | Matsumoto | G01S 7/352 |
| 2017/0123059 | A1* | 5/2017 | Asanuma | G01S 13/343 |
| 2017/0131385 | A1* | 5/2017 | Kurono | G01S 7/352 |
| 2018/0095173 | A1* | 4/2018 | Kurono | G01S 13/343 |
| 2018/0252809 | A1* | 9/2018 | Davis | G01S 7/0233 |
| 2019/0120953 | A1* | 4/2019 | Takayama | G01S 13/345 |
| 2019/0387216 | A1* | 12/2019 | Hicks | G01S 17/10 |
| 2020/0019166 | A1* | 1/2020 | Fairfield | G05D 1/0027 |
| 2020/0143656 | A1* | 5/2020 | Li | G08B 21/043 |
| 2020/0192379 | A1* | 6/2020 | Levandowski | G06V 20/58 |
| 2020/0301003 | A1* | 9/2020 | Furuta | G01S 13/931 |
| 2021/0181329 | A1* | 6/2021 | Kashiwagi | G01S 13/343 |
| 2021/0200207 | A1* | 7/2021 | Soryal | H04L 63/0884 |
| 2021/0310959 | A1* | 10/2021 | Shaviv | G01N 21/84 |
| 2022/0014681 | A1* | 1/2022 | Waitz | G02B 7/40 |
| 2022/0187438 | A1* | 6/2022 | Overdevest | G01S 13/532 |

FOREIGN PATENT DOCUMENTS

| | | | | |
|---|---|---|---|---|
| JP | 2007-322331 A | | 12/2007 | |
| JP | 2010-002410 A | | 1/2010 | |
| JP | 2017-090220 A | | 5/2017 | |
| JP | 2017090143 A | * | 5/2017 | .......... G01S 13/343 |
| JP | 2019-184595 A | | 10/2019 | |

* cited by examiner

SIGNAL PROCESSING DEVICE, SIGNAL PROCESSING METHOD, AND INFORMATION PROCESSING DEVICE

CROSS REFERENCE TO RELATED APPLICATIONS

This application is a U.S. National Phase of International Patent Application No. PCT/JP2020/011360 filed on Mar. 16, 2020, which claims priority benefit of Japanese Patent Application No. JP 2019-062506 filed in the Japan Patent Office on Mar. 28, 2019. Each of the above-referenced applications is hereby incorporated herein by reference in its entirety.

TECHNICAL FIELD

The present technology relates to a signal processing device, a signal processing method, a program, and an information processing device, and more particularly, to a signal processing device, a signal processing method, a program, and an information processing device suitable for use in a case where processing of folding correction of velocity measured by a radar is performed.

BACKGROUND ART

With a millimeter-wave radar, measurable velocity is limited, and folding of measured velocity occurs in a range exceeding the limit. Therefore, the number of times of measured velocity folding is estimated, and folding correction, which is to correct measured velocity on the basis of the estimated number of times of folding, is performed (refer to Patent Document 1, for example).

Furthermore, in recent years, a technology for sensing an object ahead of a vehicle with a combination of a camera and a millimeter-wave radar has been developed. In such a technology, there may be a case where it is required to increase a detection angle or resolution of the millimeter-wave radar according to an angle of view or resolution of a captured image.

CITATION LIST

Patent Document

Patent Document 1: Japanese Patent Application Laid-Open No. 2017-90220

SUMMARY OF THE INVENTION

Problems to be Solved by the Invention

However, in order to increase the detection angle or resolution of the millimeter-wave radar, it is necessary to increase the number of antennas, and the number of calculation of signal processing in a subsequent stage increases. Furthermore, because there is a limit to the number of times of transmission and reception of radio waves per hour, it is difficult to widen a range of measured velocity that can be directly obtained, while a range of measured velocity required for autonomous driving or drive support is very wide. Therefore, there may be a case where measured velocity folding correction is required, and it is desired to reduce the number of calculation in that case.

The present technology has been developed to solve such a problem mentioned above and to reduce processing of folding correction of velocity measured by a radar such as a millimeter-wave radar.

Solutions to Problems

A signal processing device according to a first aspect of the present technology includes a measurement unit that measures, on the basis of an output signal from a radar, a distance and relative velocity of a reflector that reflects a transmission signal from the radar, and a correction unit that performs folding correction of measured velocity of the reflector on the basis of correlation between a measured distance and measured velocity of the reflector at a certain measurement time, and a measured distance and measured velocity of the reflector at a time before the measurement time.

A signal processing method according to the first aspect of the present technology includes measuring, on the basis of an output signal from a radar, a distance and relative velocity of a reflector that reflects a transmission signal from the radar, and performing folding correction of measured velocity of the reflector on the basis of correlation between a measured distance and measured velocity of the reflector at a certain measurement time, and a measured distance and measured velocity of the reflector at a time before the measurement time.

A program according to the first aspect of the present technology causes a computer to execute processing including measuring, on the basis of an output signal from a radar, a distance and relative velocity of a reflector that reflects a transmission signal from the radar, and performing folding correction of measured velocity of the reflector on the basis of correlation between a measured distance and measured velocity of the reflector at a certain measurement time, and a measured distance and measured velocity of the reflector at a time before the measurement time.

An information processing device according to a second aspect of the present technology includes a measurement unit that measures, on the basis of an output signal from a radar, a distance, relative velocity, and direction of a reflector that reflects a transmission signal from the radar, a correction unit that performs folding correction of measured velocity of the reflector on the basis of correlation between a measured distance and measured velocity of the reflector at a certain measurement time, and a measured distance and measured velocity of the reflector at a time before the measurement time, and an object sensing unit that senses an object on the basis of a measured distance, corrected measured velocity, and measurement direction of the reflector, and supplies a subsequent stage with a result of sensing the object.

In the first aspect of the present technology, on the basis of an output signal from a radar, a distance and relative velocity of a reflector that reflects a transmission signal from the radar are measured, and folding correction of measured velocity of the reflector is performed on the basis of correlation between a measured distance and measured velocity of the reflector at a certain measurement time, and a measured distance and measured velocity of the reflector at a time before the measurement time.

In the second aspect of the present technology, on the basis of an output signal from a radar, a distance, relative velocity, and direction of a reflector that reflects a transmission signal from the radar are measured, folding correction of measured velocity of the reflector is performed on the basis of correlation between a measured distance and measured velocity of the reflector at a certain measurement time, and a measured distance and measured velocity of the reflector at a time before the measurement time, an object is sensed on the basis of a measured distance, corrected measured velocity, and measurement direction of the reflector, and a subsequent stage is supplied with a result of sensing the object.

MODE FOR CARRYING OUT THE INVENTION

Hereinafter, an embodiment for carrying out the present technology will be described. The description will be made in the following order.
1. Embodiment
2. Modifications
3. Others <<1. Embodiment>>

First, a first embodiment of the present technology will be described with reference to FIGS. 1, 2, 3, 4, 5, 6, 7, 8, 9, 10, 11A, 11B, 12, 13, 14 and 15.

Figure 1:
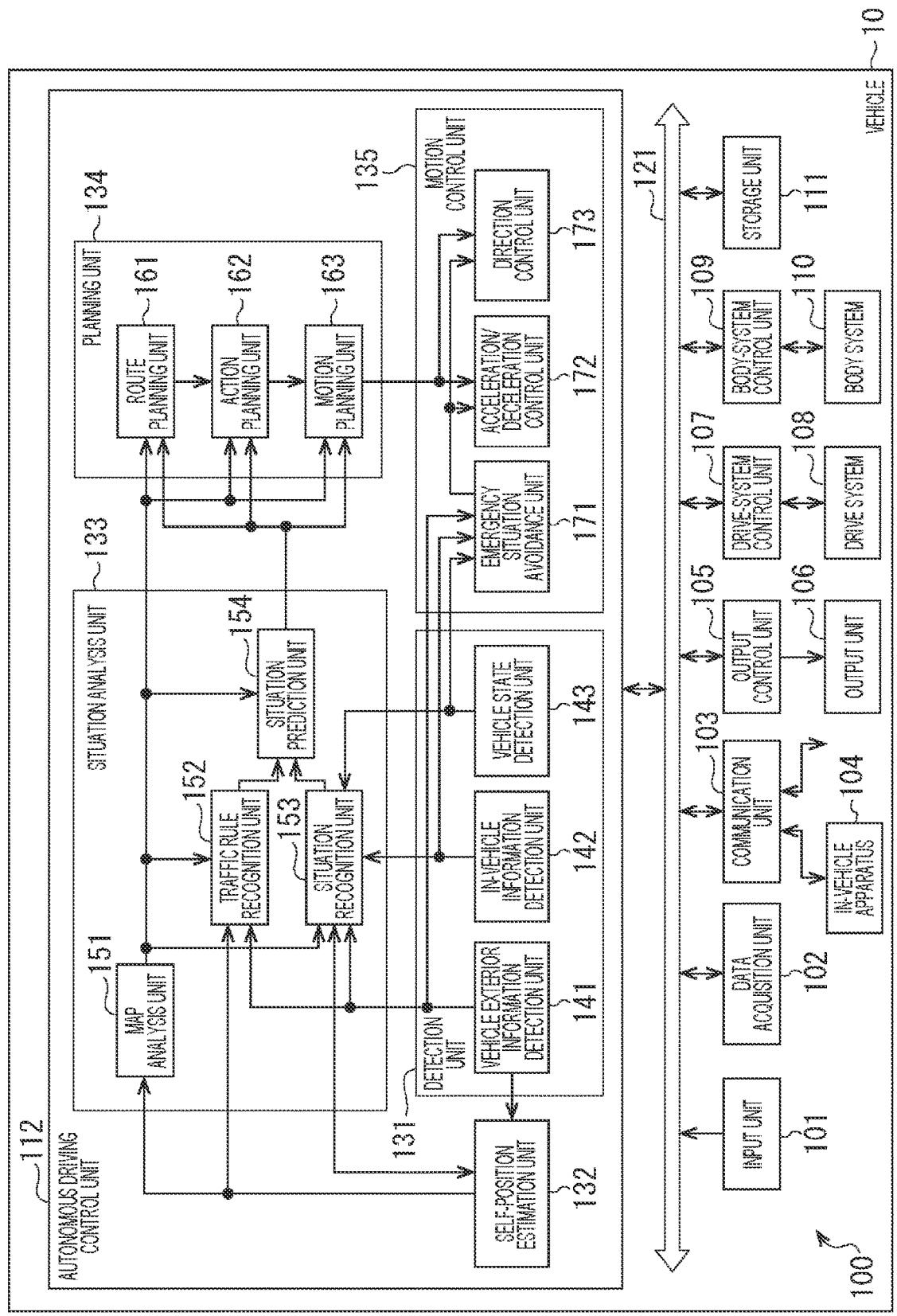
FIG. 1 is a block diagram illustrating a configuration example of a vehicle control system to which the present technology is applied.

FIG. 1 is a block diagram illustrating a schematic functional configuration example of a vehicle control system 100 as an example of a mobile object control system to which the present technology may be applied.

Note that, hereinafter, a vehicle 10 provided with the vehicle control system 100 is referred to as an own vehicle or an own vehicle in a case of being distinguished from another vehicle.

The vehicle control system 100 includes an input unit 101, a data acquisition unit 102, a communication unit 103, an in-vehicle apparatus 104, an output control unit 105, an output unit 106, a drive-system control unit 107, a drive system 108, a body-system control unit 109, a body system 110, a storage unit 111, and an autonomous driving control unit 112. The input unit 101, the data acquisition unit 102, the communication unit 103, the output control unit 105, the drive-system control unit 107, the body-system control unit 109, the storage unit 111, and the autonomous driving control unit 112 are connected to one another via a communication network 121. The communication network 121 includes, for example, an in-vehicle communication network, a bus, or the like conforming to an arbitrary standard such as a controller area network (CAN), a local interconnect network (LIN), a local area network (LAN), or FlexRay (registered trademark). Note that there may be a case where each of the units of the vehicle control system 100 is directly connected without the communication network 121.

Note that, hereinafter, in a case where each of the units of the vehicle control system 100 performs communication via the communication network 121, description of the communication network 121 will be omitted. For example, in a case where the input unit 101 and the autonomous driving control unit 112 communicate with each other via the communication network 121, it is simply described that the input unit 101 and autonomous driving control unit 112 communicate with each other.

The input unit 101 includes a device used by an occupant to input various data, an instruction, or the like. For example, the input unit 101 includes an operation device, or the like, such as a touch panel, a button, a microphone, a switch, or a lever, and an operation device capable of inputting by sound, gesture, or the like, with a method other than manual operation. Furthermore, for example, the input unit 101 may be a remote control device utilizing an infrared ray or another radio wave, or an external connection apparatus such as a mobile apparatus or wearable apparatus corresponding to operation of the vehicle control system 100. The input unit 101 generates an input signal on the basis of data, an instruction, or the like input by the occupant, and supplies the input signal to each of the units of the vehicle control system 100.

The data acquisition unit 102 includes various sensors, or the like for acquiring data used for processing the vehicle control system 100, and supplies the acquired data to each of the units of the vehicle control system 100.

For example, the data acquisition unit 102 includes various sensors for detecting a state of an own vehicle, or the like. Specifically, for example, the data acquisition unit 102 includes a gyro sensor, an acceleration sensor, an inertial measurement unit (IMU), or a sensor, or the like that detects an accelerator pedal operation amount, a brake pedal operation amount, a steering wheel steering angle, engine speed, motor speed, a rotational rate of wheels, or the like.

Furthermore, for example, the data acquisition unit 102 includes various sensors for detecting external information of the own vehicle, or the like. Specifically, for example, the data acquisition unit 102 includes an imaging device such as a Time Of Flight (ToF) camera, a stereo camera, a monocular camera, an infrared camera, or another camera. Furthermore, for example, the data acquisition unit 102 includes an environment sensor for detecting weather, a meteorological phenomenon, or the like, and a peripheral information detection sensor for detecting an object around the own vehicle. The environment sensor includes, for example, a raindrop sensor, a fog sensor, a sunshine sensor, a snow sensor, or the like. The peripheral information detection sensor includes, for example, an ultrasonic sensor, a radar, a Light Detection and Ranging, Laser Imaging Detection and Ranging (LiDAR), a sonar, or the like.

Moreover, for example, the data acquisition unit 102 includes various sensors for detecting a current position of the own vehicle, or the like. Specifically, for example, the data acquisition unit 102 includes a global navigation satellite system (GNSS) reception apparatus, or the like that receives a GNSS signal from a GNSS satellite.

Furthermore, for example, the data acquisition unit 102 includes various sensors for detecting in-vehicle information, or the like. Specifically, for example, the data acquisition unit 102 includes an imaging device that captures an image of a driver, a biosensor that detects biological information of the driver, a microphone that collects sound in a vehicle interior, or the like. The biosensor is provided, for example, on a seat surface, a steering wheel, or the like, and detects biological information of an occupant sitting on a seat or of a driver holding the steering wheel.

The communication unit 103 communicates with the in-vehicle apparatus 104 and various apparatuses, a server, a base station, or the like outside of the vehicle, and transmits data supplied from each of the units of the vehicle control system 100, or supplies received data to each of the units of the vehicle control system 100. Note that a communication protocol supported by the communication unit 103 is not particularly limited, and the communication unit 103 can also support a plurality of types of communication protocols.

For example, the communication unit 103 performs wireless communication with the in-vehicle apparatus 104 by a wireless LAN, Bluetooth (registered trademark), near field communication (NFC), a wireless USB (WUSB), or the like. Furthermore, for example, the communication unit 103 performs wired communication with the in-vehicle apparatus 104 by using a universal serial bus (USB), High-Definition Multimedia Interface (HDMI, registered trademark), Mobile High-definition Link (MHL), or the like, via an unillustrated connection terminal (and a cable, if necessary).

Moreover, for example, the communication unit 103 communicates with an apparatus (for example, an application server or a control server) existing on an external network (for example, the Internet, a cloud network, or a business-specific network) via a base station or an access point. Furthermore, for example, the communication unit 103 communicates with a terminal existing in vicinity of an own vehicle (for example, a terminal of pedestrian or store, or a Machine Type Communication (MTC) terminal) by using a Peer To Peer (P2P) technology. Moreover, for example, the communication unit 103 performs V2X communication such as vehicle to vehicle communication, vehicle to infrastructure communication, vehicle to home communication, or vehicle to pedestrian communication. Furthermore, for example, the communication unit 103 includes a beacon reception unit, receives a radio wave or electromagnetic wave transmitted from a radio station or the like installed on a road, and acquires information of a current position, a traffic congestion, a traffic regulation, required time, or the like.

The in-vehicle apparatus 104 includes, for example, a mobile apparatus or wearable apparatus that an occupant has, an information apparatus carried in or attached to the own vehicle, a navigation device for searching a route to an arbitrary destination, or the like.

The output control unit 105 controls output of various kinds of information to an occupant of the own vehicle or to outside of the vehicle. For example, by generating an output signal including at least one of visual information (for example, image data) or auditory information (for example, sound data) and supplying the output signal to the output unit 106, the output control unit 105 controls output of visual information or auditory information from the output unit 106. Specifically, for example, the output control unit 105 combines image data captured by different imaging devices of the data acquisition unit 102 to generate a bird's-eye view image, a panoramic image, or the like, and supplies the output unit 106 with an output signal including the generated image. Furthermore, for example, the output control unit 105 generates sound data including a warning sound, warning message, or the like, for a danger such as a crash, a contact, or entry into a danger zone, and supplies the output unit 106 with an output signal including the generated sound data.

The output unit 106 includes a device capable of outputting visual information or auditory information to an occupant of the own vehicle or outside of the vehicle. For example, the output unit 106 includes a display device, an instrument panel, an audio speaker, headphones, a wearable device such as a spectacle-type display, worn by an occupant, a projector, a lamp, or the like. Other than a device having a normal display, a display device included in the output unit 106 may be, for example, a device that displays visual information in a field of view of a driver, such as a head-up display, a transmissive display, or a device having an augmented reality (AR) display function.

The drive-system control unit 107 controls the drive system 108 by generating various control signals and supplying the control signals to the drive system 108. Furthermore, as necessary, the drive-system control unit 107 supplies control signals to each unit other than the drive system 108, and performs notification of a control state of the drive system 108, or the like.

The drive system 108 includes various devices related to the drive system of the own vehicle. For example, the drive system 108 includes a drive force generation device for generating drive force of an internal combustion engine, a drive motor, or the like, a drive force transmission mechanism for transmitting drive force to wheels, a steering mechanism that adjusts a steering angle, a braking device that generates braking force, antilock brake system (ABS), electronic stability control (ESC), an electronic power steering device, or the like.

The body-system control unit 109 controls the body system 110 by generating various control signals and supplying the control signals to the body system 110. Furthermore, as necessary, the body-system control unit 109 supplies control signals to each unit other than the body system 110, and performs notification of a control state of the body system 110, or the like.

The body system 110 includes various body devices mounted on the vehicle body. For example, the body system 110 includes a keyless entry system, a smart key system, a power window device, a power seat, a steering wheel, an air conditioning device, various lamps (for example, headlamps, rear lamps, brake lamps, blinkers, fog lamps, or the like), or the like.

The storage unit 111 includes, for example, a magnetic storage device, such as a read only memory (ROM), a random access memory (RAM), or a hard disc drive (HDD), a semiconductor storage device, an optical storage device, an optical magnetic storage device, or the like. The storage unit 111 stores various programs, data, or the like used by each of the units of the vehicle control system 100. For example, the storage unit 111 stores map data of a three-dimensional high-precision map such as a dynamic map, a global map covering wide area and having low precision as compared to the high-precision map, a local map including peripheral information of the own vehicle, or the like.

The autonomous driving control unit 112 performs control related to autonomous driving such as autonomous traveling or drive support. Specifically, for example, the autonomous driving control unit 112 performs coordination control for a purpose of implementation of a function of an advanced driver assistance system (ADAS) including crash avoidance or impact mitigation of the own vehicle, following travel based on an inter-vehicle distance, vehicle speed maintenance traveling, crash warning of an own vehicle, a lane deviation warning of the own vehicle, or the like. Furthermore, for example, the autonomous driving control unit 112 performs coordination control for a purpose of autonomous driving or the like that is autonomous traveling without depending on operation by the driver. The autonomous driving control unit 112 includes a detection unit 131, a self-position estimation unit 132, a situation analysis unit 133, a planning unit 134, and a motion control unit 135.

The detection unit 131 detects various kinds of information necessary for controlling autonomous driving. The detection unit 131 includes a vehicle exterior information detection unit 141, an in-vehicle information detection unit 142, and a vehicle state detection unit 143.

The vehicle exterior information detection unit 141 performs detection processing of information outside of the own vehicle on the basis of data or a signal from each of the units of the vehicle control system 100. For example, the vehicle exterior information detection unit 141 performs detection processing or recognition processing of an object around the own vehicle, tracking processing, and detection processing for a distance to the object. Objects to be detected include, for example, a vehicle, a human, an obstacle, a structure, a road, a traffic light, a traffic sign, a road marking, and the like. Furthermore, for example, the vehicle exterior information detection unit 141 performs detection processing of environment around the own vehicle. Surrounding environment to be detected includes, for example, weather, temperature, humidity, brightness, a road surface condition, and the like. The vehicle exterior information detection unit 141 supplies data indicating a result of detection processing to the self-position estimation unit 132, a map analysis unit 151, traffic rule recognition unit 152, or situation recognition unit 153 of the situation analysis unit 133, an emergency situation avoidance unit 171 of the motion control unit 135, or the like.

The in-vehicle information detection unit 142 performs detection processing of in-vehicle information on the basis of data or a signal from each of the units of the vehicle control system 100. For example, the in-vehicle information detection unit 142 performs driver authentication processing, driver recognition processing, driver state detection processing, occupant detection processing, in-vehicle environment detection processing, or the like. States of the driver to be detected include, for example, a physical condition, an arousal level, a level of concentration, a level of fatigue, a direction of a line of sight, and the like. In-vehicle environment to be detected includes, for example, temperature, humidity, brightness, odor, and the like. The in-vehicle information detection unit 142 supplies data indicating a result of detection processing to the situation recognition unit 153 of the situation analysis unit 133, the emergency situation avoidance unit 171 of the motion control unit 135, or the like.

The vehicle state detection unit 143 performs detection processing of a state of the own vehicle on the basis of data or a signal from each of the units of the vehicle control system 100. States of the own vehicle to be detected include, for example, speed, acceleration, a steering angle, presence or absence, or content of abnormality, a driving operation state, a position or inclination of a power seat, a state of a door lock, a state of another vehicle-mounted apparatus, and the like. The vehicle state detection unit 143 supplies data indicating a result of detection processing to the situation recognition unit 153 of the situation analysis unit 133, the emergency situation avoidance unit 171 of the motion control unit 135, or the like.

The self-position estimation unit 132 performs processing for estimating a position, orientation, or the like of the own vehicle on the basis of data or a signal from each of the units of the vehicle control system 100, such as the vehicle exterior information detection unit 141 or the situation recognition unit 153 of the situation analysis unit 133. Furthermore, the self-position estimation unit 132 generates a local map used for self-position estimation (hereinafter, referred to as a self-position estimation map), as necessary. The self-position estimation map is, for example, a high-precision map using a technique such as simultaneous localization and mapping (SLAM). The self-position estimation unit 132 supplies data indicating a result of the estimation processing to the map analysis unit 151, traffic rule recognition unit 152, or situation recognition unit 153 of the situation analysis unit 133, or the like. Furthermore, the self-position estimation unit 132 stores the self-position estimation map in the storage unit 111.

The situation analysis unit 133 performs processing for analyzing a situation of the own vehicle or surroundings. The situation analysis unit 133 includes the map analysis unit 151, the traffic rule recognition unit 152, the situation recognition unit 153, and a situation prediction unit 154.

The map analysis unit 151 performs processing for analyzing various maps stored in the storage unit 111 by using data or a signal from each of the units of the vehicle control system 100, such as the self-position estimation unit 132 or the vehicle exterior information detection unit 141, as necessary, and constructs a map including information necessary for processing for autonomous driving. The map analysis unit 151 supplies the constructed map to the traffic rule recognition unit 152, the situation recognition unit 153, the situation prediction unit 154, a route planning unit 161, action planning unit 162, or motion planning unit 163 of the planning unit 134, or the like.

The traffic rule recognition unit 152 performs processing for recognition of a traffic rule around the own vehicle on the basis of data or a signal from each of the units of the vehicle control system 100, such as the self-position estimation unit 132, the vehicle exterior information detection unit 141, or the map analysis unit 151. By this recognition processing, for example, a position or state of a traffic signal around the own vehicle, content of a traffic regulation around the own vehicle, a drivable lane, or the like can be recognized. The traffic rule recognition unit 152 supplies data indicating a result of recognition processing to the situation prediction unit 154, or the like.

The situation recognition unit 153 performs processing for recognition of a situation related to the own vehicle on the basis of data or a signal from each of the units of the vehicle control system 100, such as the self-position estimation unit 132, the vehicle exterior information detection unit 141, the in-vehicle information detection unit 142, the vehicle state detection unit 143, or the map analysis unit 151. For example, the situation recognition unit 153 performs processing for recognition of a situation of the own vehicle, a situation around the own vehicle, a situation of a driver of the own vehicle, or the like. Furthermore, the situation recognition unit 153 generates a local map used for recognizing a situation around the own vehicle (hereinafter, referred to as a situation recognition map), as necessary. The situation recognition map is, for example, an occupancy grid map.

Situations of the own vehicle to be recognized include, for example, a position, orientation, motion (for example, speed, acceleration, moving direction, or the like) of the own vehicle, presence or absence, or content of abnormality, and the like. Situations of surroundings of the own vehicle to be recognized include, for example, a type or position of a surrounding stationary object, a type, position, or motion (for example, speed, acceleration, moving direction, or the like) of a surrounding moving object, a configuration of a surrounding road, a condition of a surface of the road, weather, temperature, humidity, or brightness of surroundings, and the like. States of the driver to be recognized include, for example, a physical condition, an arousal level, a level of concentration, a level of fatigue, movement of a line of sight, driving operation, and the like.

The situation recognition unit 153 supplies data indicating a result of recognition processing (including a situation recognition map, as necessary) to the self-position estimation unit 132, the situation prediction unit 154, or the like. Furthermore, the situation recognition unit 153 stores a situation recognition map in the storage unit 111.

The situation prediction unit 154 performs processing for predicting a situation related to the own vehicle on the basis of data or a signal from each of the units of the vehicle control system 100, such as the map analysis unit 151, the traffic rule recognition unit 152, or the situation recognition unit 153. For example, the situation prediction unit 154 performs processing for prediction of a situation of the own vehicle, a surrounding situation of the own vehicle, a situation of a driver, or the like.

Situations of the own vehicle to be predicted include, for example, behavior of the own vehicle, an occurrence of abnormality, a travelable distance, and the like. Situations of surroundings of the own vehicle to be predicted include, for example, behavior of a moving object around the own vehicle, a change in a state of a signal, an environmental change such as weather, and the like. Situations of the driver to be predicted include, for example, behavior or physical condition of the driver, and the like.

The situation prediction unit 154 supplies data indicating a result of prediction processing to the route planning unit 161, action planning unit 162, or motion planning unit 163 of the planning unit 134, or the like, along with data from the traffic rule recognition unit 152 and the situation recognition unit 153.

The route planning unit 161 plans a route to a destination on the basis of data or a signal from each of the units of the vehicle control system 100, such as the map analysis unit 151 or the situation prediction unit 154. For example, the route planning unit 161 sets a route from a current position to a specified destination on the basis of a global map. Furthermore, for example, the route planning unit 161 changes a route as appropriate, on the basis of a situation of a traffic congestion, accident, traffic regulation, construction, or the like, or a condition of the driver, or the like. The route planning unit 161 supplies data indicating a planned route to the action planning unit 162, or the like.

The action planning unit 162 plans action of the own vehicle to safely travel on a route planned by the route planning unit 161 within a planned time on the basis of data or a signal from each of the units of the vehicle control system 100, such as the map analysis unit 151 or the situation prediction unit 154. For example, the action planning unit 162 plans starting, stopping, a traveling direction (for example, a forward motion, a rearward motion, a left turn, a right turn, a change in direction, or the like), a driving lane, traveling speed, overtaking, or the like. The action planning unit 162 supplies data indicating a planned action of the own vehicle to the motion planning unit 163, or the like.

The motion planning unit 163 plans motion of the own vehicle to achieve action planned by the action planning unit 162 on the basis of data or a signal from each of the units of the vehicle control system 100, such as the map analysis unit 151 or the situation prediction unit 154. For example, the motion planning unit 163 plans acceleration, deceleration, traveling track, or the like. The motion planning unit 163 supplies data indicating a planned motion of the own vehicle to an acceleration/deceleration control unit 172 or a direction control unit 173 of the motion control unit 135, or the like.

The motion control unit 135 controls motion of the own vehicle. The motion control unit 135 includes the emergency situation avoidance unit 171, the acceleration/deceleration control unit 172, and the direction control unit 173.

The emergency situation avoidance unit 171 performs processing for detection of an emergency situation such as a crash, a contact, entry into a danger zone, abnormally of a driver, or abnormality of the vehicle, on the basis of a result of detection by the vehicle exterior information detection unit 141, the in-vehicle information detection unit 142, or the vehicle state detection unit 143. In a case where an emergency situation is detected, the emergency situation avoidance unit 171 plans motion of the own vehicle to avoid the emergency situation such as a sudden stop or a sharp turn. The emergency situation avoidance unit 171 supplies data indicating a planned motion of the own vehicle to the acceleration/deceleration control unit 172 or the direction control unit 173, or the like.

The acceleration/deceleration control unit 172 performs acceleration/deceleration control for achieving motion of the own vehicle planned by the motion planning unit 163 or the emergency situation avoidance unit 171. For example, the acceleration/deceleration control unit 172 calculates a control target value for the drive force generation device or braking device for achieving a planned acceleration, deceleration, or sudden stop, and supplies the drive-system control unit 107 with a control command indicating a calculated control target value.

The direction control unit 173 performs direction control for achieving motion of the own vehicle planned by the motion planning unit 163 or the emergency situation avoidance unit 171. For example, the direction control unit 173 calculates a control target value for a steering mechanism for achieving a traveling track or sharp turn planned by the motion planning unit 163 or the emergency situation avoidance unit 171, and supplies the drive-system control unit 107 with a control command indicating a calculated control target value.

<Configuration Example of Data Acquisition Unit 102 and Vehicle Exterior Information Detection Unit 141>

Figure 2:
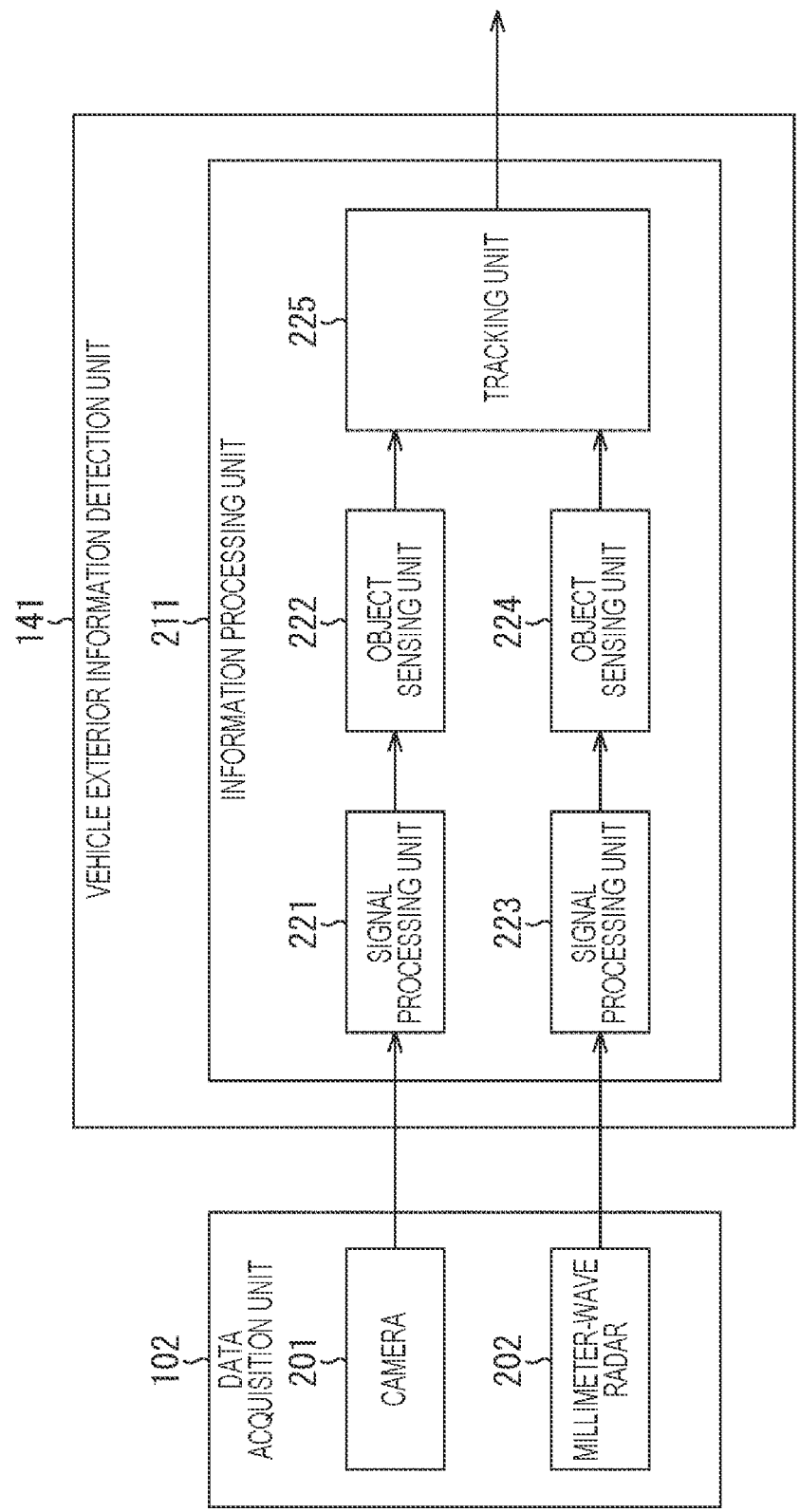
FIG. 2 is a block diagram illustrating a configuration example of a data acquisition unit and a vehicle exterior information detection unit.

FIG. 2 illustrates a part of a configuration example of the data acquisition unit 102 and vehicle exterior information detection unit 141 of the vehicle control system 100.

The data acquisition unit 102 includes a camera 201 and a millimeter-wave radar 202. The vehicle exterior information detection unit 141 includes an information processing unit 211. The information processing unit 211 includes a signal processing unit 221, an object sensing unit 222, a signal processing unit 223, an object sensing unit 224, and a tracking unit 225.

For example, the camera 201 captures an image of a view ahead of the vehicle 10 and supplies an image obtained by the image capturing (hereinafter, referred to as a captured image) to the signal processing unit 221.

The millimeter-wave radar 202 includes, for example, a frequency modulated continuous wave (FMCW) millimeter-wave radar. The millimeter-wave radar 202 performs sensing of any object ahead of the vehicle 10, and at least a part of a sensing area overlaps with the camera 201. For example, ahead of the vehicle 10, the millimeter-wave radar 202 transmits a transmission signal including a millimeter wave, and receives a reception signal, which is a signal reflected by a reflector ahead of the vehicle 10, with a reception antenna. For example, a plurality of reception antennas is provided at a predetermined interval in a lateral direction (width direction) of the vehicle 10. Furthermore, a plurality of reception antennas may also be provided in a height direction.

The millimeter-wave radar 202 supplies the signal processing unit 223 with a beat signal (hereinafter, referred to as a radar output signal) obtained by combining a transmission signal and reception signals received from the respective reception antennas. Frequency of a radar output signal is a difference frequency between frequency of the transmission signal and frequency of each of the reception signals.

The signal processing unit 221 performs predetermined signal processing on the captured image. For example, the signal processing unit 221 performs RGB development of the captured image. That is, the signal processing unit 221 performs interpolation processing of an R component, a G component, and a B component of each pixel of the captured image. The signal processing unit 221 supplies the captured image after the signal processing to the object sensing unit 222.

The object sensing unit 222 performs sensing processing of an object ahead of the vehicle 10 on the basis of the captured image. The object sensing unit 222 supplies data indicating a result of sensing the object to the tracking unit 225.

The signal processing unit 223 measures a position (distance and direction) and relative velocity of a reflector ahead of the vehicle 10 by performing predetermined signal processing on the radar output signal. The signal processing unit 223 generates a radar chart indicating the position and relative velocity of each of the reflectors ahead of the vehicle 10 and intensity of a reception signal reflected by each of the reflectors, and supplies the radar chart to the object sensing unit 224.

The object sensing unit 224 performs sensing processing of the object ahead of the vehicle 10 on the basis of the radar chart. The object sensing unit 224 supplies the tracking unit 225 with data indicating a result of sensing the object.

The tracking unit 225 performs tracking processing of a target object ahead of the vehicle 10 by using a filter that estimates and predicts a state on the basis of a value observed by, for example, a Kalman filter, a particle filter, or the like. For example, the tracking unit 225 estimates a current state of the target object ahead of the vehicle 10 on the basis of a result of sensing an object by the object sensing unit 222, a result of sensing the object by the object sensing unit 224, and a result of predicting a state of the target object ahead of the vehicle 10. Furthermore, the tracking unit 225 predicts a future state of the target object ahead of the vehicle 10 on the basis of the result of sensing the object by the object sensing unit 222, the result of sensing the object by the object sensing unit 224, and the result of estimating the current state of the target object ahead of the vehicle 10 by the tracking unit 225.

Here, the target object is an object to be tracked that is ahead of the vehicle 10, and any object can be set as the target object. However, it is desirable to set, as the target object, an object including a portion having a high reflectance to a transmission signal from the millimeter-wave radar 202.

Furthermore, as a state of the target object, for example, estimation and prediction of a position (distance and direction), relative velocity, and the like of the target object are performed.

The tracking unit 225 supplies data indicating a result of estimating a state of the target object to, for example, the self-position estimation unit 132, a map analysis unit 151, traffic rule recognition unit 152, or situation recognition unit 153 of the situation analysis unit 133, an emergency situation avoidance unit 171 of the motion control unit 135, or the like.

<Example of Transmission Signal from Millimeter-Wave Radar 202 and Velocity Folding>

Figure 3:
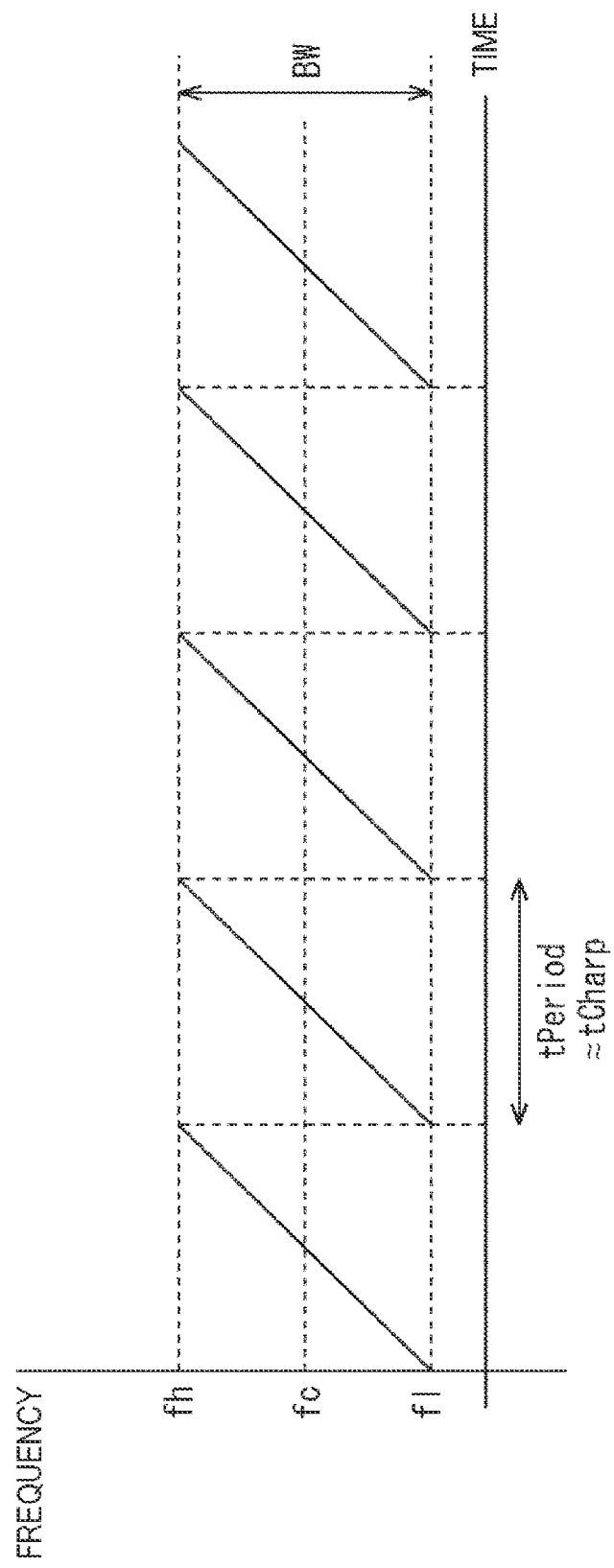
FIG. 3 is a diagram illustrating an example of a waveform from a transmission signal from a millimeter-wave radar.

FIG. 3 illustrates an example of a waveform of a transmission signal transmitted from the millimeter-wave radar 202. The horizontal axis represents time, and the vertical axis represents frequency.

A transmission signal from a millimeter-wave radar is a sawtooth wave signal in which one type of chirp signal is continuously repeated, the chirp signal having frequency that linearly and monotonically increases, and a plurality of chirp signals is included in one frame. Here, a frame of a transmission signal is a unit of measuring a position and relative velocity of a reflector, and a position and relative velocity of a reflector is measured for each frame. Furthermore, frequency of a chirp signal monotonically increases from a minimum frequency fl to a maximum frequency fh.

Note that, hereinafter, a period for transmitting a chirp signal (hereinafter, referred to as a chirp period) is expressed as tPeriod, and a length of a chirp signal (hereinafter, referred to as a chirp time) is expressed as tCharp. Note that the chirp time is a time from start (rising) to end (falling) of transmission of one chirp signal, and in this example, the chirp period tPeriod and the chirp time tCharp are substantially equal. Furthermore, hereinafter, a frequency width of a chirp signal is expressed as BW, and a center frequency between a minimum frequency fl and a maximum frequency fh is expressed as fc.

Here, a maximum measurement range Rmax that can be measured by using the millimeter-wave radar 202 is expressed by the following Mathematical Formula (1).

$$R\text{max} = (c \times t\text{Charp}/2BW) \times (fs/2) \qquad (1)$$

In Mathematical Formula (1), c represents speed of light, and fs represents a sampling frequency of a radar output signal.

Furthermore, a distance resolution is expressed by the following Mathematical Formula (2).

$$\text{Distance resolution} = R\max/(N\text{FFT}/2) \quad (2)$$

NFFT in Mathematical Formula (2) represents the number of samples of range FFT processing to be described later.

Meanwhile, a maximum measurement velocity (Nyquist rate) Vmax that can be measured by using the millimeter-wave radar 202 is expressed by the following Mathematical Formula (3).

$$V\max = c/(4fc \times t\text{Period}) \quad (3)$$

Furthermore, a velocity resolution is expressed by the following Mathematical Formula (4).

$$\text{Velocity resolution} = V\max/(N\text{CHIRP}/2) \quad (4)$$

NCHIRP in Mathematical Formula (4) represents the number of times of transmission of chirp signals in one frame of a transmission signal.

Note that, as is clear from Mathematical Formula (3), a maximum measurement velocity Vmax can be increased by shortening a chirp period tPeriod. Therefore, theoretically, by shortening the chirp period tPeriod and increasing a repetition rate of the chirp signal, the maximum measurement velocity Vmax can be increased to a level at which folding correction is unnecessary.

Meanwhile, if the chirp period tPeriod is shortened, the chirp time tCharp is shortened. As a result, as is clear from Mathematical Formula (1), the maximum measurement range Rmax is shortened. That is, a maximum measurement range Rmax and a maximum measurement velocity Vmax are in a trade-off relation with each other.

Here, in the information processing unit 211 in FIG. 2, sensing and tracking of an object are performed on the basis of a captured image captured by the camera 201 and a radar output signal output from the millimeter-wave radar 202. Furthermore, in the vehicle control system 100, for example, it is assumed that a result of detecting a reflector using the millimeter-wave radar 202 is superimposed and displayed on the captured image.

Therefore, the maximum measurement range Rmax of the millimeter-wave radar 202 is required to be equal to or longer than a maximum measurement range of the camera 201. Therefore, because the chirp time tCharp ($\approx$ chirp period tPeriod) cannot be too short, the maximum measurement velocity Vmax is limited.

Figure 4:
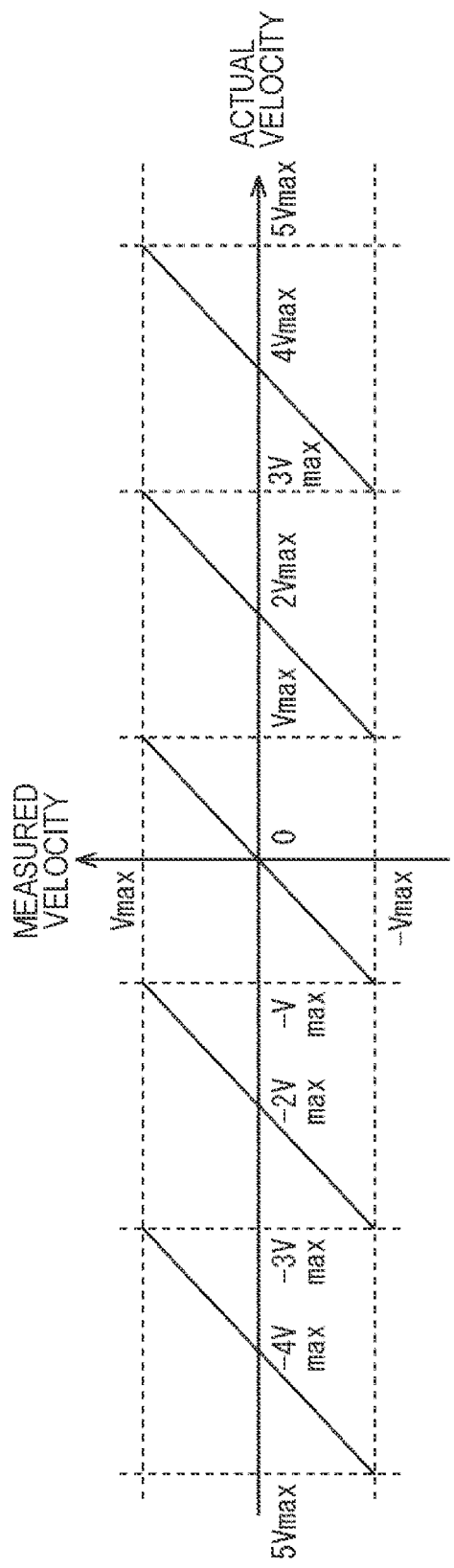
FIG. 4 is a diagram for describing velocity folding.

As a result, as illustrated in FIG. 4, velocity folding occurs within a range where an absolute value of relative velocity of the reflector ahead of the vehicle 10 exceeds the maximum measurement velocity Vmax. The horizontal axis represents actual velocity (relative velocity) of a reflector, and the vertical axis represents measured velocity. Regarding directions of the relative velocity, a direction away from the vehicle 10 is assumed to be a positive direction, and a direction approaching the vehicle 10 is assumed to be a negative direction.

As illustrated in this figure, in a range where an absolute value of relative velocity is equal to or less than Vmax, actual velocity and measured velocity match. Meanwhile, in a range where the absolute value of the relative velocity exceeds Vmax, velocity folding occurs, and speed ambiguity (Speed Ambiguity) occurs in which the absolute value of the measured velocity is smaller than the actual velocity or a sign of the measured velocity is inverted.

Then, In the range in which the absolute value of the relative velocity exceeds Vmax, a relation between the measured velocity and the actual velocity is as expressed by the following Mathematical Formula (5).

$$\text{Actual velocity} = \text{measured velocity} + 2k \times V\max \quad (5)$$

In Mathematical Formula (5), k represents the number of times of folding. The number of times of folding k is a positive value in a range where the actual velocity is positive, and is a negative value in a range where the actual velocity is negative.

Thus, because velocity folding occurs by the maximum measurement velocity Vmax being limited, measured velocity folding correction, which will be described later, is required.

Furthermore, it is required to increase a detection angle or resolution of the millimeter-wave radar 202 in accordance with an angle of view or resolution of the captured image.

For example, it is necessary to increase the number of reception antennas of the millimeter-wave radar 202 in order to increase the detection angle of the millimeter-wave radar without reducing measurement accuracy in a direction of a reflector. However, the number of calculation by the signal processing unit 223 increases in proportion to the cube of the number of the reception antennas.

Furthermore, in order to increase the resolution of the millimeter-wave radar 202, it is necessary to reduce distance resolution or to use information included in the reception signal as effectively as possible instead of discarding the information. As a result, the number of calculation by the signal processing unit 223 further increases.

Therefore, it is necessary to reduce processing of measured velocity folding correction.

In contrast, in the present technology, processing of measured velocity folding correction is reduced as will be described later.

<Configuration Example of Signal Processing Unit 223>

Figure 5:
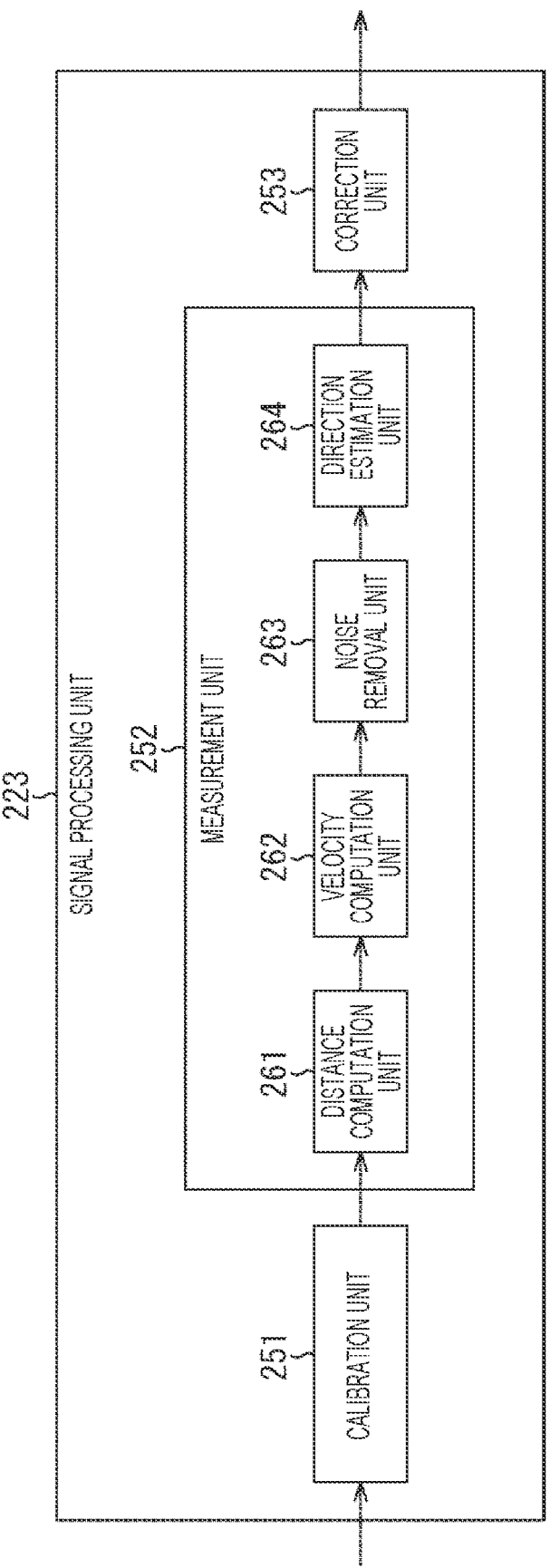
FIG. 5 is a block diagram illustrating a configuration example of a signal processing unit in FIG. 2.

FIG. 5 illustrates a configuration example of the signal processing unit 223 in FIG. 2.

The signal processing unit 223 includes a calibration unit 251, a measurement unit 252, and a correction unit 253.

The calibration unit 251 calibrates the radar output signal supplied from the millimeter-wave radar 202, and supplies the calibrated radar output signal to the measurement unit 252.

The measurement unit 252 measures a position (distance and direction) and relative velocity of a reflector ahead of the vehicle 10 on the basis of the radar output signal. The measurement unit 252 includes a distance computation unit 261, a velocity computation unit 262, a noise removal unit 263, and a direction estimation unit 264.

The distance computation unit 261 computes distance of a reflector ahead of the vehicle 10. For example, the distance computation unit 261 performs range fast Fourier transform (FFT) processing on a radar output signal, and supplies the obtained signal (hereinafter, referred to as a range FFT signal) to the velocity computation unit 262.

The velocity computation unit 262 computes a relative velocity of a reflector ahead of the vehicle 10. The velocity computation unit 262 performs Doppler FFT processing on the range FFT signal and supplies the obtained signal (hereinafter, referred to as a Doppler FFT signal) to the noise removal unit 263.

The noise removal unit 263 removes noise in the Doppler FFT signal and supplies the signal to the direction estimation unit 264.

The direction estimation unit 264 estimates a direction of a reflector ahead of the vehicle 10 on the basis of the Doppler FFT signal from which noise has been removed. The direction estimation unit 264 generates a radar chart indicating the position and relative velocity of each of reflectors ahead of the vehicle 10 and intensity of a reception signal reflected by each of the reflectors, and supplies the radar chart to the correction unit 253.

The correction unit 253 corrects the measured velocity of each of the reflectors on the basis of correlation between a measured position and measured velocity of a reflector ahead of the vehicle 10 of the past, and a current measured position and measured velocity of a reflector ahead of the vehicle 10. Then, the correction unit 253 supplies a radar chart reflecting corrected relative velocity of each of the reflectors to the object sensing unit 224.

<Configuration Example of Calibration Circuit 301>

Figure 6:
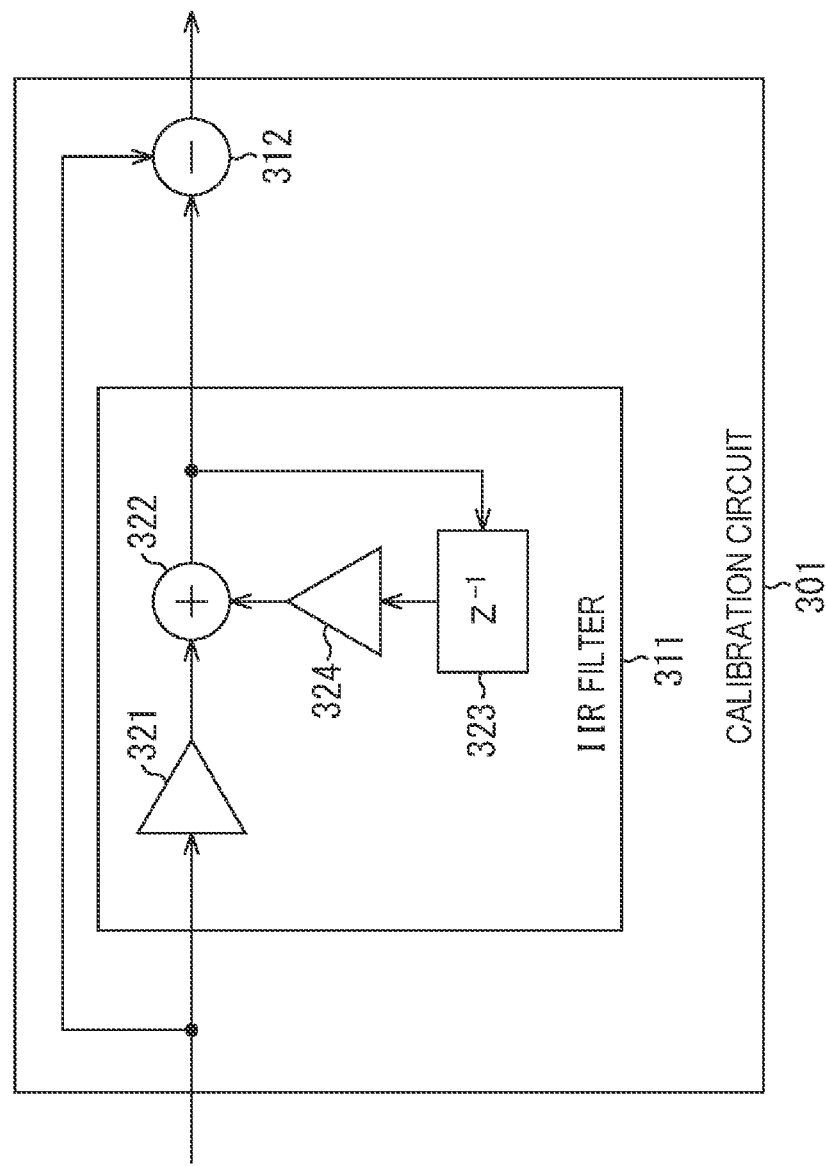
FIG. 6 is a circuit diagram illustrating a configuration example of a calibration circuit.

FIG. 6 illustrates a configuration example of the calibration circuit 301 included in the calibration unit 251 in FIG. 5.

The calibration circuit 301 includes an infinite impulse response (IIR) filter 311 and a subtraction unit 312. The IIR filter 311 includes an attenuation unit 321, an addition unit 322, a delay element 323, and an attenuation unit 324.

An input signal input to the calibration circuit 301 is supplied to the subtraction unit 312 and the attenuation unit 321.

The attenuation unit 321 attenuates the input signal and supplies the attenuated input signal to the addition unit 322.

The addition unit 322 generates an average signal by adding the input signal supplied from the attenuation unit 321 and a feedback signal supplied from the attenuation unit 324. The addition unit 322 supplies the average signal to the subtraction unit 312 and supplies the average signal as a feedback signal to the delay element 323.

The delay element 323 delays the feedback signal by one cycle of the input signal with z conversion, and supplies the feedback signal to the attenuation unit 324.

The attenuation unit 324 attenuates the feedback signal and supplies the attenuated feedback signal to the addition unit 322.

The subtraction unit 312 outputs a difference signal obtained by deriving a difference between the input signal and the average signal.

For example, an IIR filter 311 of 1% is implemented by the attenuation unit 321 attenuating amplitude of an input signal to 1%, and by the attenuation unit 324 attenuating amplitude of a feedback signal to 99%. Then, the IIR filter 311 outputs an average signal obtained by averaging the input signals from the past to the present, and the subtraction unit 312 outputs a signal obtained by subtracting the average signal from the current input signal. Therefore, from the calibration circuit 301, a signal is output from the input signal from which random noise including a DC component is removed.

<Measurement Processing>

Next, measurement processing executed by the signal processing unit 223 will be described with reference to the flowchart in FIG. 7.

In step S1, the calibration unit 251 calibrates a radar output signal.

Specifically, the millimeter-wave radar 202 supplies radar output signals corresponding to reception signals received by the respective reception antennas to the calibration unit 251.

For example, to each of the radar output signals, the calibration unit 251 adjusts a difference in propagation time generated by a difference in length of wiring from each of the reception antennas, or applies a gain for correcting a difference in sensitivity of each of the reception antennas.

Furthermore, each of the radar output signals is input to the calibration circuit 301 of the calibration unit 251. The calibration circuit 301 calibrates each of the radar output signals by deriving a difference between each of the radar output signals and an average signal of each of the calibrated radar output signals, and supplies each of the calibrated radar output signals to the distance computation unit 261.

Figure 8:
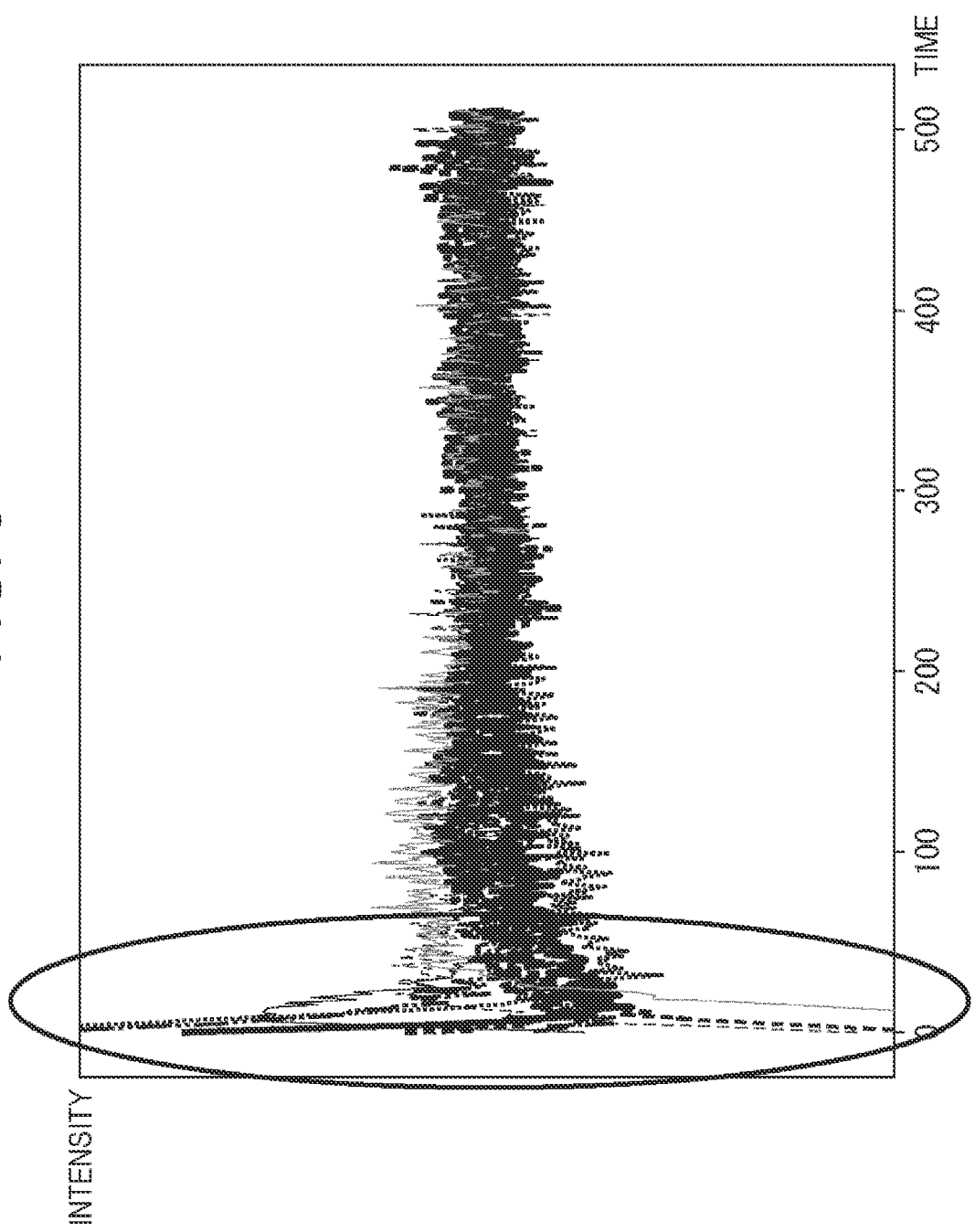
FIG. 8 is a diagram illustrating an example of a waveform of a reception signal of a millimeter-wave radar.

FIG. 8 illustrates an example of waveforms of reception signals received by respective reception antennas of the millimeter-wave radar 202 for one chirp signal of a transmission signal. The horizontal axis represents time, and the vertical axis represents intensity.

As illustrated in a circled part in the figure, there may be a case where random noise is superimposed on the reception signals at a start of a chirp signal. Due to this noise, there may be a case where it is erroneously recognized that a reflector exists immediately in front of the vehicle 10.

In contrast, by the calibration circuit 301 deriving a difference between each of the radar output signals and an average signal of each of the radar output signals, a component caused by noise in each of the reception signals is removed from each of the radar output signals.

In step S2, the distance computation unit 261 performs distance computation. Specifically, the distance computation unit 261 performs range FFT processing on each of the radar output signals. For example, the distance computation unit 261 performs FFT with DC cut on each of the radar output signals for each chirp period. With this arrangement, for each chirp signal of the transmission signal and for each reception antenna of the millimeter-wave radar 202, a frequency component corresponding to distance to the reflector ahead of the vehicle 10 is extracted from each of the radar output signals.

The distance computation unit 261 supplies the velocity computation unit 262 with a range FFT signal obtained by performing range FFT on each of the radar output signals.

Figure 9:
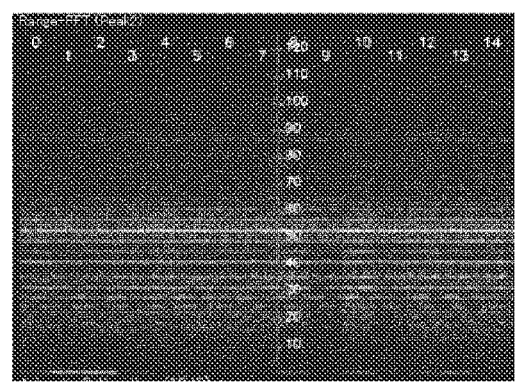
FIG. 9 is a diagram illustrating an example of waveforms of range FFT signals.

FIG. 9 illustrates an example of waveforms of the respective range FFT signals. The horizontal axis represents the number of reception antennas corresponding to the radar output signals, which are basis of the respective range FFT signals, and the vertical axis represents distance. Furthermore, intensity of the range FFT signals is represented in luminance.

In step S3, the velocity computation unit 262 performs velocity computation. Specifically, the velocity computation unit 262 performs Doppler FFT on each of the range FFT signals. For example, the velocity computation unit 262 performs FFT without DC cut in units of frames for each predetermined frequency band (for each predetermined distance range) of each range FFT signal. With this arrangement, for each frame of the transmission signal, for each reception antenna of the millimeter-wave radar 202, and for each range of a predetermined distance, a frequency component corresponding to relative velocity of the reflector ahead of the vehicle 10 is extracted from each of the range FFT signals.

The velocity computation unit 262 supplies the noise removal unit 263 with Doppler FFT signals obtained by performing Doppler FFT on the respective range FFT signals.

Figure 10:
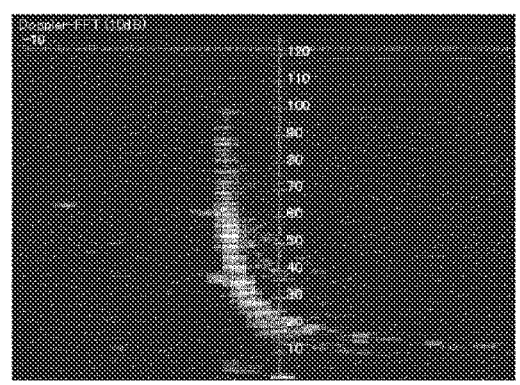
FIG. 10 is a diagram illustrating an example of waveforms of Doppler FFT signals.

FIG. 10 illustrates an example of waveforms of Doppler FFT signals. The horizontal axis represents relative velocity, and the vertical axis represents distance. Furthermore, intensity of the Doppler FFT signals is represented in luminance.

In step S4, the noise removal unit 263 removes noise. Specifically, the noise removal unit 263 removes noise in each of the Doppler FFT signals by applying a gain having a characteristic illustrated in FIGS. 11A and 11B, for each range of (frequency corresponding to) a predetermined distance of each of the Doppler FFT signals and each range of (frequency corresponding to) a predetermined velocity of each of the Doppler FFT signals.

Figure 11A:
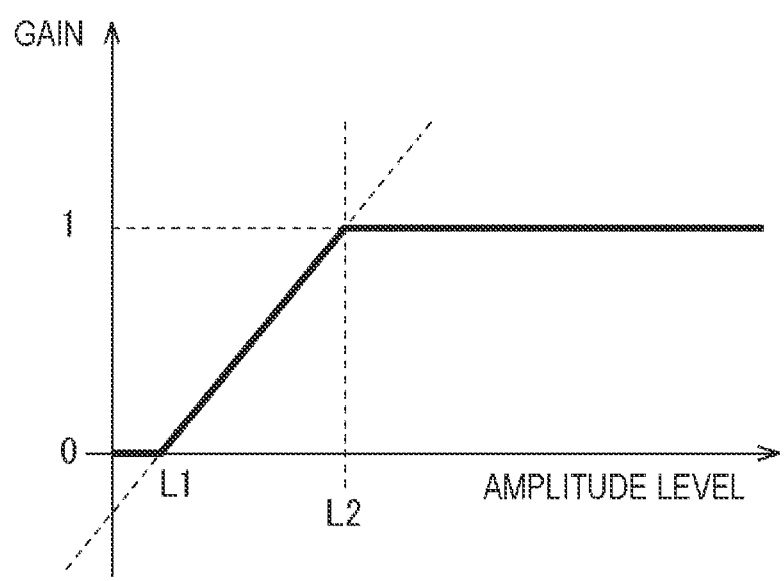
FIGS. 11A and 11B are diagrams for describing characteristics of a noise removal unit.

Specifically, of FIG. 11A illustrates gain characteristics of the noise removal unit 263. The horizontal axis represents an amplitude level of an input signal, and the vertical axis represents gain. An amplitude level of an input signal is calculated by, for example, the following Mathematical Formula (6).

$$\text{Amplitude level} = 20 \times \log_{10} \sqrt{(Re^2 + Im^2)} \qquad (6)$$

Re represents a real number component of the input signal (Doppler FFT signal), and Im represents an imaginary number component of the input signal (Doppler FFT signal).

The gain is set to 0 in a range where the amplitude level is 0 or L1, the gain linearly increases to 1 in a range where the amplitude level is L1 to L2, and the gain is set to 1 in a range where the amplitude level is L2 or more.

Figure 11B:
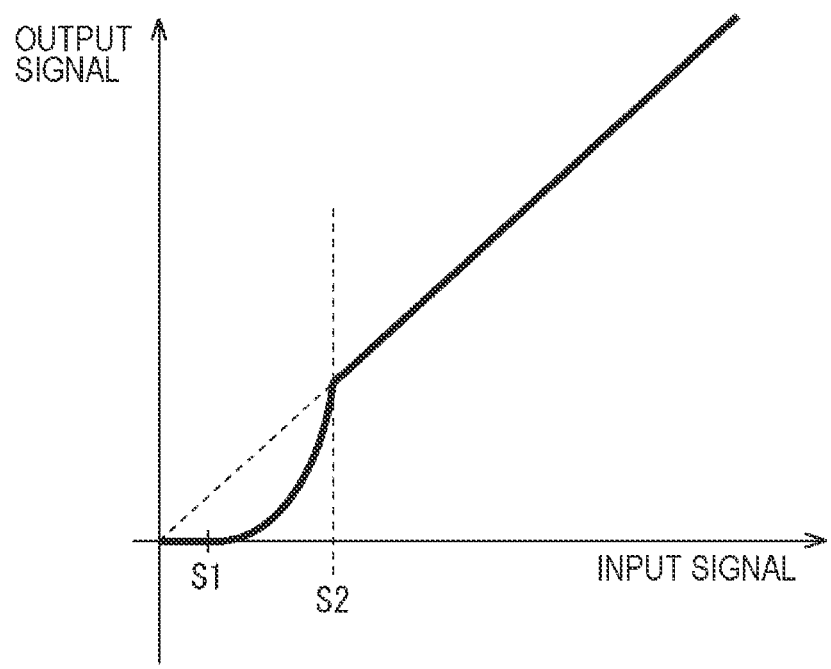

FIG. 11B illustrates input/output characteristic of the noise removal unit 263. The horizontal axis represents intensity of an input signal (Doppler FFT signal), and the vertical axis represents intensity of an output signal.

When the intensity of the input signal is in a range of 0 to S1, the intensity of the output signal is set to 0. When the intensity of the input signal is in the range of S1 to S2, the intensity of the output signal increases parabolically with respect to the intensity of the input signal. When the intensity of the input signal is in the range of S2 or more, the intensity of the output signal is equal to the intensity of the input signal.

With this arrangement, a component in the range where intensity of the Doppler FFT signal is less than S2 is attenuated, and noise is removed from the Doppler FFT signal. As a result, for example, erroneous recognition of an object ahead of the vehicle 10 is prevented.

The noise removal unit 263 supplies the direction estimation unit 264 with each Doppler FFT signal from which noise has been removed.

In step S5, the direction estimation unit 264 performs direction estimation. That is, on the basis of each Doppler FFT signal, the direction estimation unit 264 estimates a direction (azimuth) of the reflector ahead of the vehicle 10, in which intensity of the signal is equal to or greater than a predetermined threshold.

Note that any method can be used as a method for estimating a direction of the object, and for example, the Capon's method is used. Specifically, for example, a method described in "Nobuyoshi Kikuma, 'Fundamentals of Array Antennas', Department of Computer Science and Engineering, Nagoya Institute of Technology, M W E, 2009" or in "On Robust Capon Beamforming and Diagonal Loading, Jian Li, Senior Member, IEEE, Petre Stoica, Fellow, IEEE, and Zhisong Wang, Student Member, IEEE 2003" is used.

The direction estimation unit 264 generates a signal intensity radar chart indicating a distance and direction of each of the reflectors ahead of the vehicle 10 and distribution of intensity of a reception signal reflected by each of the reflectors, and a velocity radar chart indicating distribution of a distance, direction, and relative velocity of an object ahead of the vehicle 10. Then, the direction estimation unit 264 supplies the signal intensity radar chart and the velocity radar chart to the correction unit 253.

Figure 12:
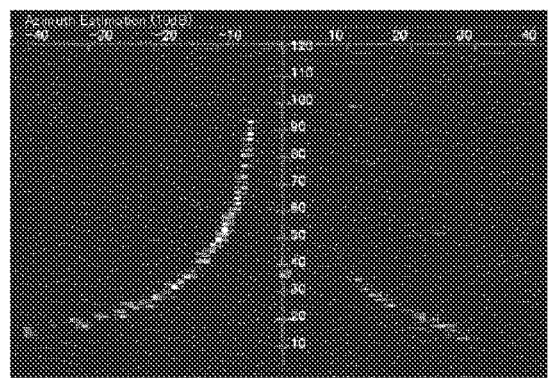
FIG. 12 is a diagram illustrating an example of a result of measuring distances and directions of reflectors.

FIG. 12 is a diagram illustrating an example of a result of measuring distances and directions of reflectors ahead of the vehicle 10. The horizontal axis represents direction, and the vertical axis represents distance. Furthermore, intensity of a reception signal corresponding to each of the reflectors is indicated in luminance.

Figure 13:
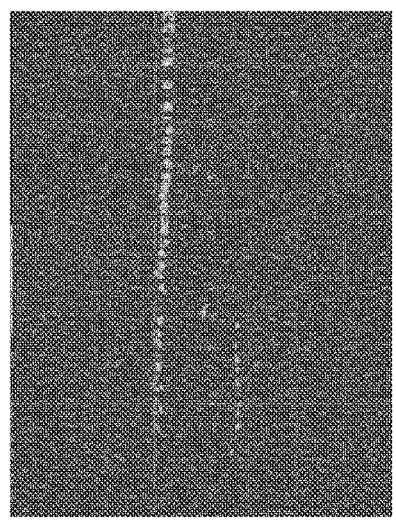
FIG. 13 is a diagram illustrating an example of a signal intensity radar chart.

FIG. 13 is a diagram illustrating an example in which a result of measuring distances and directions of each of the reflectors in FIG. 12 is converted into a signal intensity radar chart. The horizontal axis represents a distance in a direction perpendicular to a traveling direction of the vehicle 10 (lateral direction), and the vertical axis represents a distance in the traveling direction of the vehicle 10 (vertical direction). Furthermore, intensity of a reception signal corresponding to each of the reflectors is indicated in luminance.

In step S6, the correction unit 253 performs velocity correction. That is, the correction unit 253 corrects the measured velocity of each of the reflectors on the basis of correlation between a measured distance and measured velocity of a reflector ahead of the vehicle 10 in a frame of the past, and a measured distance and measured velocity of a reflector ahead of the vehicle 10 in a current frame.

For example, the correction unit 253 classifies reflectors detected two frames before, reflectors detected one frame before, and reflectors detected in the current frame into a plurality of groups for each corresponding object. That is, in the two frames before, the one frame before, and the current frame, reflectors presumed to correspond to the same object are grouped into one group. Note that, for example, reflectors corresponding to a long and large object, such as a guardrail, are divided into a plurality of groups on the basis of positions or the like of the reflectors. Then, the correction unit 253 performs the following processing for each group.

For example, the correction unit 253 changes relative velocity of each of the reflectors according to the above-described Mathematical Formula (5) by changing the number of times of measured velocity folding of each of the reflectors two frames before within a predetermined range (for example, within a range of −5 times to +5 times). Then, the correction unit 253 predicts a distance of each of the reflectors in the current frame on the basis of relative velocity in each number of times of folding and a measured distance of each of the reflectors two frames before.

Note that, here, for example, assuming that all the reflectors are moving in a direction parallel to the traveling direction of the vehicle 10, the measured velocity of each of the reflectors two frames before may be corrected on the basis of a measurement direction.

Figure 14:
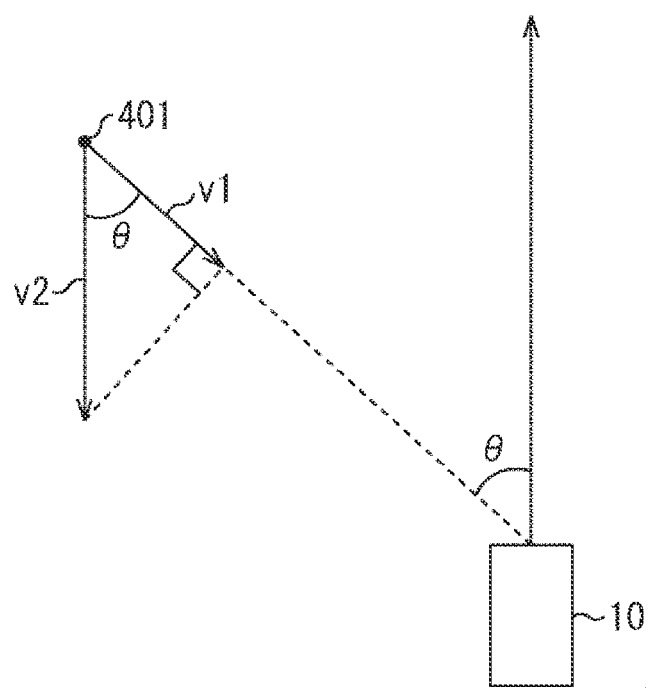
FIG. 14 is a diagram for describing a method for correcting a measured velocity on the basis of a measurement direction.

For example, as illustrated in FIG. 14, there will be described a case where, in two frames before, a reflector 401 is detected in a direction of an angle θ with respect to a traveling direction (vertical direction) of the vehicle 10 indicated by an arrow, and a measured value of relative velocity of the reflector 401 is v1. Note that a direction perpendicular to the traveling direction of the vehicle 10 is the lateral direction (width direction) of the vehicle 10. In this case, the correction unit 253 may correct measured velocity v1 of the reflector to measured velocity v2 in a direction opposite to the traveling direction of the vehicle 10 by using the following Mathematical Formula (7), and predict a distance of the reflector 401 in the current frame on the basis of the measured velocity v2.

$$v2 = v1 \times \cos\theta \qquad (7)$$

Similarly, the correction unit 253 predicts a distance of each of the reflectors in the current frame in each number of times of folding on the basis of measured velocity and measured distance of each of the reflectors one frame before.

Then, the correction unit 253 estimates the number of times of folding of reflectors in a group by comparing a predicted distance of each of the reflectors predicted on the basis of a measurement result of a frame of the past with a measured distance of each of the current reflectors.

For example, the correction unit 253 calculates accuracy of the following Mathematical Formula (8) for each number of times of folding.

$$\text{Accuracy} = (TP+TN)/(TP+FP+FN+TN) \quad (8)$$

TP is the number of reflectors for which, in the group, a predicted distance and predicted velocity based on a result of measuring a frame of the past match a measured distance and measured velocity of the current frame. For example, TP is the number of reflectors for which a predicted distance and predicted velocity based on a measurement result of two frames before, a predicted distance and predicted velocity based on a measurement result of one frame before, and a measured distance and measured velocity in the current frame match.

FP is the number of cases where, in the group, there is no reflector in the current frame, the reflector matching a predicted distance and predicted velocity based on a result of measuring a reflector in a frame of the past. A frame of the past refers to, for example, one frame before or two frames before.

FN is the number of cases where, in the group, although there is a reflector in the current frame, there are no predicted distance and predicted velocity based on a result of measuring the reflector in a frame of the past. A frame of the past refers to, for example, one frame before or two frames before.

TN is the number of cases where, in the group, there is no reflector in the current frame, and there is no predicted distance or predicted velocity based on a result of measuring the reflector in a frame of the past. A frame of the past refers to, for example, one frame before or two frames before.

Note that TP, FP, and FN in Mathematical Formula (8) may be obtained by individually comparing the predicted distance based on the measurement result two frames before with the measured distance in the current frame, and the predicted distance based on the measurement result one frame before with the measured distance in the current frame. That is, TP, FP, and FN in Mathematical Formula (8) may be obtained by separately counting a result of comparing the predicted distance based on the measurement result two frames before with the measured distance in the current frame, and a result of comparing the predicted distance based on the measurement result one frame before with the measured distance in the current frame.

Then, the correction unit 253 estimates the number of times of folding with maximum accuracy to be the number of times of folding of a reflector in the group. Here, the number of times of folding of a center of the reflector in the group is obtained. Alternatively, it may be estimated that the number of times of folding of the reflectors in the group is all the same. Then, the correction unit 253 corrects the measured velocity of each of the reflectors detected in the current frame in the group to actual relative velocity on the basis of the above-described Mathematical Formula (5) and the estimated number of times of folding.

In this manner, the correction unit 253 estimates the number of times of folding of reflectors in each of groups, and corrects measured velocity of the reflectors in each of the groups on the basis of the estimated number of times of folding. With this arrangement, measured velocity of an object corresponding to each of the groups is corrected.

Furthermore, the correction unit 253 corrects measured velocity of each reflector in the velocity radar chart. The correction unit 253 supplies the signal intensity radar chart and a corrected velocity radar chart to the object sensing unit 224.

Thereafter, the processing returns to step S1, and processing in and after step S1 is executed. With this arrangement, measured velocity of each reflector is corrected for each frame.

As described above, it is possible to reduce processing of folding correction of measured velocity of each of the reflectors ahead of the vehicle 10.

For example, conventionally, a method for transmitting a plurality of types (patterns) of chirp signals having different chirp times tCharp and estimating the number of times of folding using a Chinese Remainder Theorem a (CRT) as a prediction algorithm is often used. However, in this method, because it is necessary to transmit a plurality of types of chirp signals, time required for measurement of relative velocity is long. Furthermore, it is necessary to switch a plurality of types of chirp signals at high speed, by which a circuit is complicated. Moreover, use of CRT increases the number of calculation.

Meanwhile, with the present technology, only one type of chirp signal needs to be used, and therefore, it is not necessary to use a complicating circuit, and time required for measuring relative velocity can be shortened. Furthermore, because a complicating algorithm such as CRT is not used, the number of calculation can be reduced.

Furthermore, by performing calibration with the calibration circuit 301 in FIG. 6 and noise removal with the noise removal unit 263 in FIG. 5, it is possible to reduce chances of erroneous sensing of an object even if resolution of a reflector to be detected on the basis of a radar output signal from the millimeter-wave radar 202 is increased (even if the number of reflectors to be detected is increased).

Figure 15:
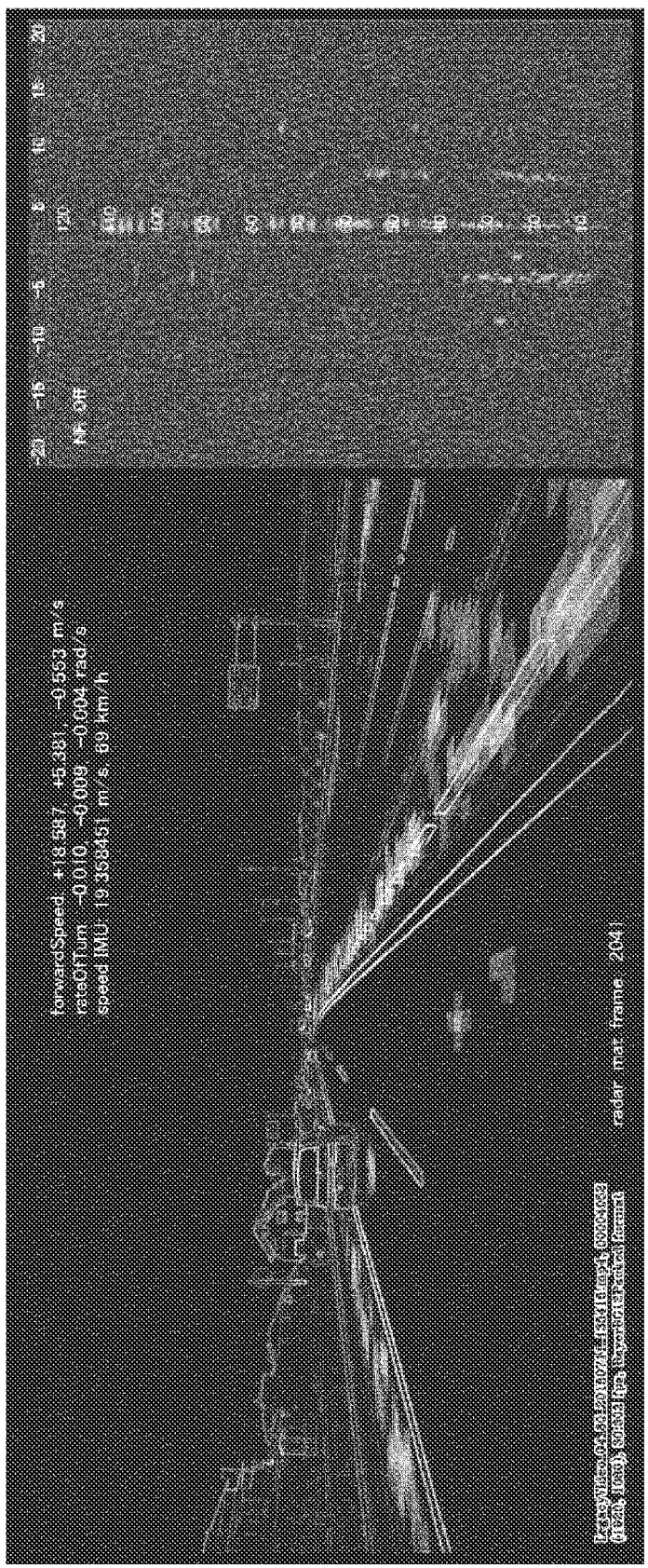
FIG. 15 is a diagram illustrating an example of a detection result of a reflector in a case where noise removal is not performed.
Figure 16:
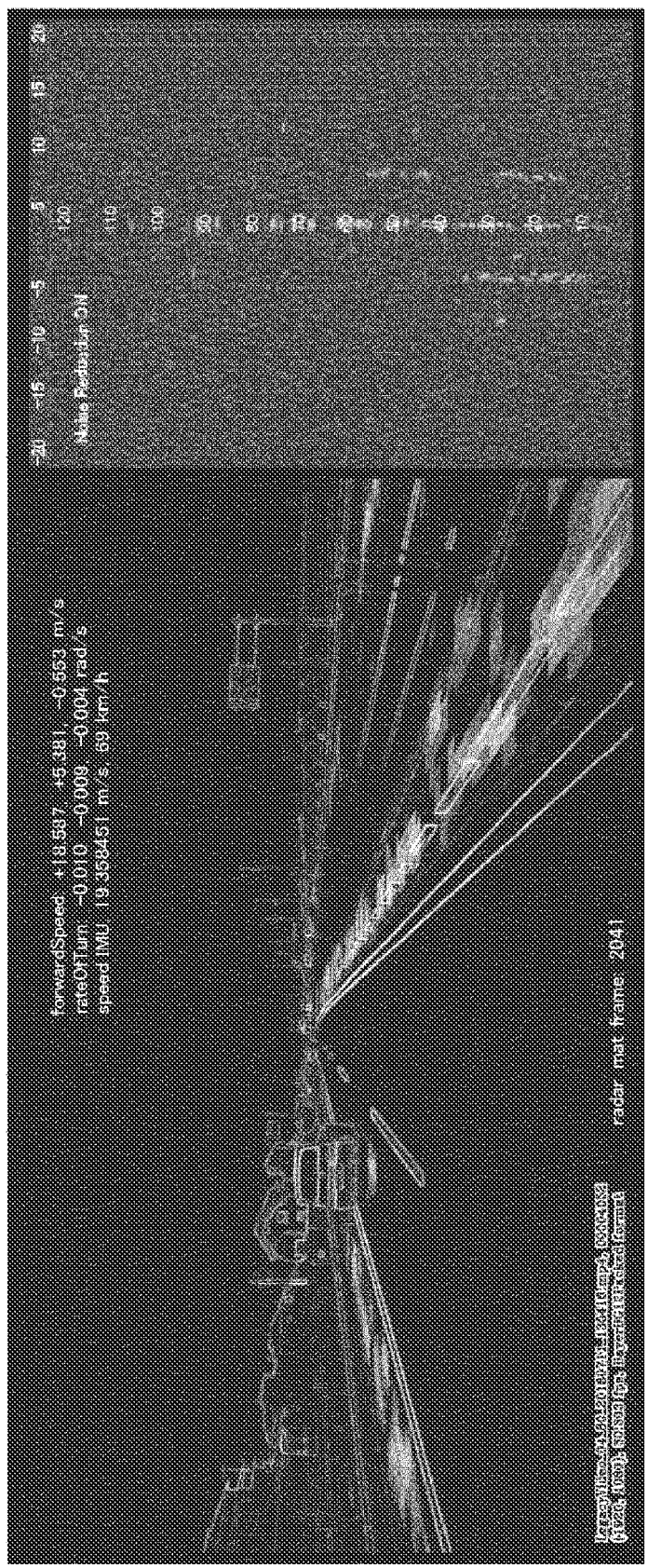
FIG. 16 is a diagram illustrating an example of a detection result of the reflector in a case where noise removal is performed.

FIGS. 15 and 16 are diagrams for comparing presence or absence of noise removal from a Doppler FFT signal.

FIG. 15 illustrates an example of a detection result of a reflector based on a radar output signal in a case where noise removal has not been performed. A signal intensity radar chart is illustrated on a right side. On a left side, there is illustrated an image for which an image obtained by superimposing a result of detecting a reflector, which corresponds to the signal intensity radar chart on the right side, on a captured image is monochromated.

FIG. 16 illustrates an example of a detection result of a reflector based on a radar output signal in a case where noise removal has been performed. Similarly to FIG. 15, a signal intensity radar chart is illustrated on a right side, and, on a left side, there is illustrated an image for which an image obtained by superimposing a result of detecting a reflector, which corresponds to the signal intensity radar chart on the right side, on a captured image is monochromated.

As is clear from comparison between FIG. 15 and FIG. 16, the number of detected reflectors, which are other than reflectors corresponding to main objects ahead of the vehicle 10 (for example, a vehicle ahead, a lane marking of a road, and a guardrail) that requires sensing, are reduced in the case where noise removal is performed. With this arrangement, for example, reflectors corresponding to a main object can be detected with high resolution, and erroneous sensing of other objects is prevented.

Furthermore, in conventional processing, for example, only information of reflectors corresponding to a characteristic point of a main object has been extracted from among detected reflectors, and information of other reflectors has been discarded. However, in the present technology, information of other reflectors is also supplied to a subsequent stage instead of being discarded. As a result, more information can be utilized in subsequent processing, and for example, improvement in object sensing accuracy or the like can be expected.

<<2. Modifications>>

Hereinafter, modifications of the above-described embodiment of the present technology will be described.

For example, the present technology can also be applied to a case where a chirp signal having a waveform other than a sawtooth wave, which is a mountain-shaped waveform for example, is used for a transmission signal.

Furthermore, the present technology can also be applied to a case of using a transmission signal other than a chirp signal, for example, a pulsed transmission signal.

Moreover, the present technology can also be applied to a case where relative velocity of a reflector is measured with a method other than Doppler FFT.

Furthermore, the present technology can also be applied to a case of using a radar other than a millimeter-wave radar (for example, a laser radar).

Figure 7:
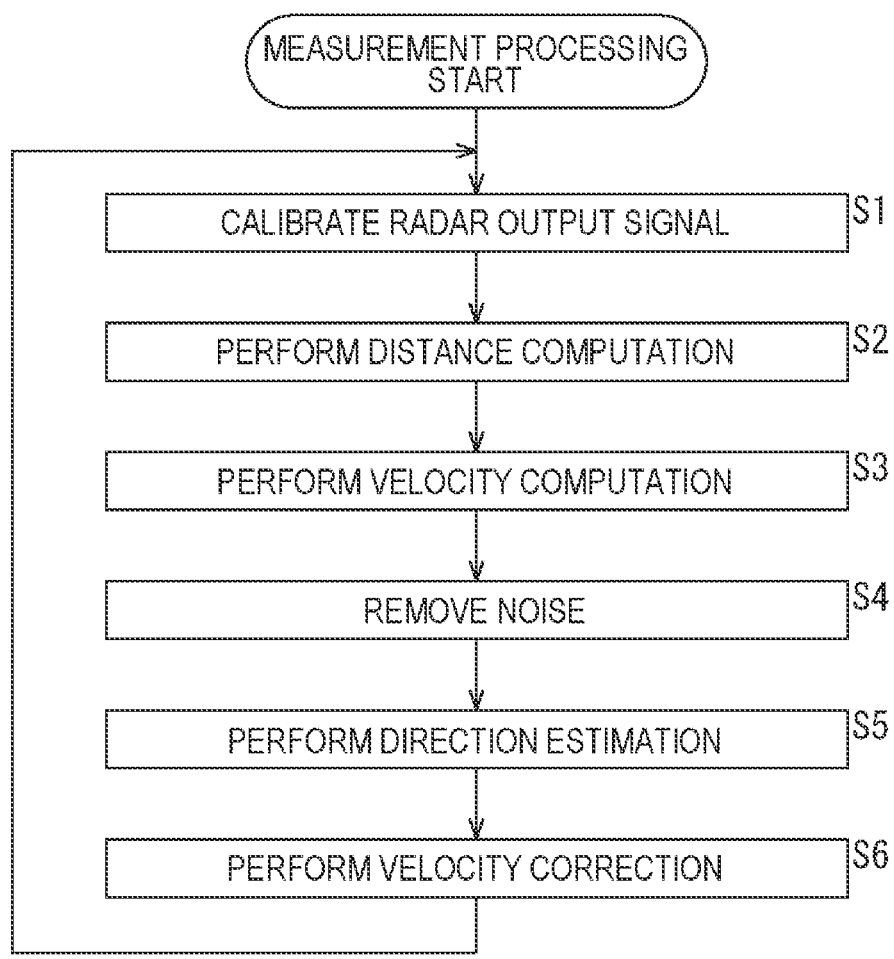
FIG. 7 is a flowchart for describing measurement processing executed by the signal processing unit in FIG. 5.

Moreover, the measurement processing in FIG. 7 does not necessarily need to be performed in a case where velocity folding does not occur, that is, a case where an absolute value of relative velocity of an object around the vehicle 10 is equal to or less than a maximum measurement velocity Vmax. Therefore, for example, the measurement processing in FIG. 7 may not be performed when the vehicle 10 is stopped or in a traffic congestion. Furthermore, for example, in a case where the vehicle 10 moves backward, a result of measuring an object ahead of the vehicle 10 is unnecessary, and therefore, the measurement processing in FIG. 7 may not be performed.

Furthermore, for example, the correction unit 253 may correct current measured velocity of a reflector simply on the basis of corrected relative velocity of a reflector of the past.

For example, from the above-described Mathematical Formula (5), candidates for current relative velocity of the reflector take discrete values on the basis of measured velocity and the number of times of folding k. For example, in a case where the measured velocity is Vmax/2 and the number of times of folding k is in the range of −5 times to +5 times, candidates for relative velocity are −9.5 Vmax, −7.5 Vmax, −5.5 Vmax, −3.5 Vmax, −1.5 Vmax, 0.5 Vmax, 2.5 Vmax, 4.5 Vmax, 6.5 Vamx, 8.5 Vmax, and 10.5 Vmax.

Meanwhile, it is assumed that the relative velocity of the reflector does not change much between normal frames. Therefore, for example, in a case where, among candidates for the relative velocity, there is a candidate of which difference from corrected relative velocity of the reflector in the past (for example, one frame before) is less than a predetermined threshold, the correction unit 253 estimates that the candidate is a current relative velocity of the reflector. Meanwhile, for example, in a case where, among candidates for the relative velocity, there is no candidate of which difference from corrected relative velocity of the reflector in the past (for example, one frame before) is less than a predetermined threshold, the correction unit 253 corrects the measured velocity of the reflector with the above-described method. With this arrangement, the number of calculation can be reduced.

Moreover, for example, the present technology can also be applied to a case where relative velocity of a reflector in a direction other than a direction ahead of the vehicle 10 is measured.

Furthermore, the present technology can also be applied to a case of measuring relative velocity of a reflector around a mobile object other than a vehicle. For example, a mobile object such as a motorcycle, a bicycle, a personal mobility, an airplane, a ship, a construction machine, or an agricultural machine (tractor) is assumed. Furthermore, a mobile object to which the present technology can be applied includes, for example, a mobile object such as a drone or a robot, which is remotely driven (operated) without a user on board.

Furthermore, the present technology can also be applied to, for example, a case of measuring relative velocity of a reflector at a fixed place such as a monitoring system.

<<3. Others>>

<Configuration Example of Computer>

The above-described series of processing can be executed by hardware or can be executed by software. In a case where a series of processing is executed by software, a program included in the software is installed on a computer. Here, the computer includes, a computer incorporated in dedicated hardware, a general-purpose personal computer for example, which is capable of executing various kinds of functions by installing various programs, or the like.

Figure 17:
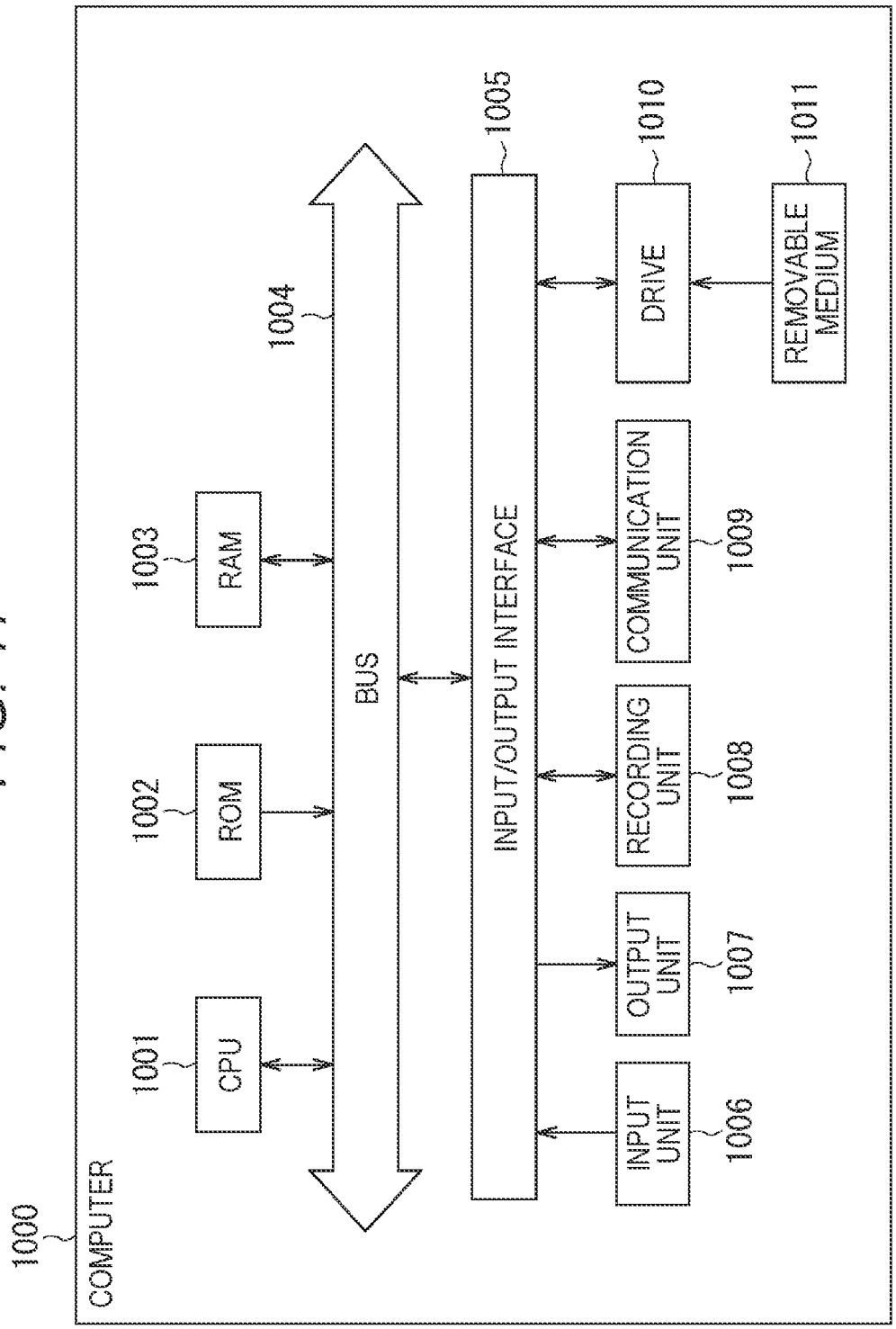
FIG. 17 is a diagram illustrating a configuration example of a computer.

FIG. 17 is a block diagram illustrating a configuration example of hardware of a computer that executes the series of processing described above by a program.

In a computer 1000, a central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an image sensor, or the like. The output unit 1007 includes a display, a speaker, or the like. The recording unit 1008 includes a hard disk, a non-volatile memory, or the like. The communication unit 1009 includes a network interface, or the like. The drive 1010 drives a removable medium 1011 such as a magnetic disk, an optical disk, a magneto-optical disk, or a semiconductor memory.

In the computer 1000 configured as above, the series of processing described above is executed by the CPU 1001 loading, for example, a program recorded in the recording unit 1008 to the RAM 1003 via the input/output interface 1005 and the bus 1004 and executing the program.

A program executed by the computer 1000 (CPU 1001) can be provided by being recorded on the removable medium 1011 as a package medium, or the like, for example. Furthermore, the program can be provided via a wired or wireless transmission medium such as a local area network, the Internet, or digital satellite broadcasting.

In the computer 1000, the program can be installed on the recording unit 1008 via the input/output interface 1005 by attaching the removable medium 1011 to the drive 1010. Furthermore, the program can be received by the communication unit 1009 via the wired or wireless transmission medium and installed on the recording unit 1008. In addition, the program can be installed on the ROM 1002 or the recording unit 1008 in advance.

Note that, the program executed by the computer may be a program that is processed in time series in an order described in this specification, or a program that is processed in parallel or at a necessary timing such as when a call is made.

Furthermore, in the present specification, the system means a set of a plurality of components (devices, modules (parts), or the like) without regard to whether or not all the components are in the same housing. Therefore, a plurality of devices housed in separate housings and connected via a network, and one device housing a plurality of modules in one housing are both systems.

Moreover, an embodiment of the present technology is not limited to the above-described embodiment, and various changes can be made without departing from the scope of the present technology.

For example, the present technology can have a configuration of cloud computing in which one function is shared and processed jointly by a plurality of devices via a network.

Furthermore, each step described in the above-described flowchart can be executed by one device, or can be executed by being shared by a plurality of devices.

Moreover, in a case where a plurality of pieces of processing is included in one step, the plurality of pieces of processing included in the one step can be executed by being shared by a plurality of devices, in addition to being executed by one device.

<Example of Configuration Combination>

The present technology can have the following configurations.

(1)

A signal processing device including:

a measurement unit that measures, on the basis of an output signal from a radar, a distance and relative velocity of a reflector that reflects a transmission signal from the radar; and a correction unit that performs folding correction of measured velocity of the reflector on the basis of correlation between a measured distance and measured velocity of the reflector at a certain measurement time, and a measured distance and measured velocity of the reflector at a time before the measurement time.

(2)

The signal processing device according to (1), in which the correction unit predicts a distance of the reflector at the measurement time for each number of times of the folding while changing the number of times of folding of measured velocity of the reflector on the basis of the measured distance and measured velocity of the reflector at the time before the measurement time, estimates the number of times of the folding by comparing a predicted distance and measured distance of the reflector at the measurement time, and corrects measured velocity of the reflector on the basis of the number of times of folding that is estimated.

(3)

The signal processing device according to (2), in which the correction unit estimates the number of times of folding of relative velocity of a plurality of the reflectors by comparing predicted distances of a plurality of the reflectors corresponding to the same object at the measurement time and measured distances, and corrects measured velocity of a plurality of the reflectors on the basis of the number of times of folding that is estimated.

(4)

The signal processing device according to (2) or (3), in which the measurement unit further measures a direction of the reflector, and the correction unit predicts a distance of the reflector at the measurement time for each number of times of the folding on the basis of measured velocity obtained by correcting measured velocity of the reflector at the time before the measurement time on the basis of a measurement direction.

(5)

The signal processing device according to any one of (1) to (4), in which the measurement unit measures a distance and relative velocity of the reflector by performing range FFT processing and Doppler FFT processing on the output signal.

(6)

The signal processing device according to (5), in which the measurement unit removes noise from an FFT signal after performing the range FFT processing and the Doppler FFT processing on the output signal, and measures a direction of the reflector on the basis of the FFT signal from which the noise is removed.

(7)

The signal processing device according to (6), in which the measurement unit removes the noise by attenuating a component having intensity less than a predetermined intensity of the FFT signal.

(8)

The signal processing device according to any one of (1) to (7), further including a calibration unit that calibrates the output signal, in which the measurement unit measures a distance and relative velocity of the reflector on the basis of the output signal that is calibrated.

(9)

The signal processing device according to (8), in which the calibration unit derives a difference between the output signal and an average signal of the output signal from a past to a present.

(10)

The signal processing device according to any one of (1) to (9), in which the measurement unit measures a distance and relative velocity of the reflector for each frame including a plurality of chirp signals.

(11)

The signal processing device according to (10), in which the transmission signal includes a signal in which one type of chirp signal is repeated.

(12)

The signal processing device according to (10) or (11), in which the correction unit performs the folding correction on the basis of correlation between a measured distance and measured velocity of the reflector in a first frame, and a measured distance and measured velocity of the reflector in a frame before the first frame.

(13)

The signal processing device according to (12), in which the correction unit performs the folding correction on the basis of correlation between a measured distance and measured velocity of the reflector in the first frame, and a measured distance and measured velocity of the reflector in a second frame that is one frame before the first frame and in a third frame that is two frames before the first frame.

(14)

The signal processing device according to any one of (1) to (13), in which the correction unit corrects measured velocity of the reflector on the basis of corrected relative velocity of the reflector at a time before the measurement time.

(15)

The signal processing device according to any one of (1) to (14), in which the radar includes a millimeter-wave radar.

(16)

The signal processing device according to any one of (1) to (15), in which the measurement unit measures a distance and relative velocity of the reflector around a mobile object.

(17)

The signal processing device according to any one of (1) to (16), in which the folding of the measured velocity occurs in a case where an absolute value of relative velocity of the reflector exceeds a predetermined maximum measurement velocity.

(18)

A signal processing method including:

measuring, on the basis of an output signal from a radar, a distance and relative velocity of a reflector that reflects a transmission signal from the radar, and performing folding correction of measured velocity of the reflector on the basis of correlation between a measured distance and measured velocity of the reflector at a certain measurement time, and a measured distance and measured velocity of the reflector at a time before the measurement time.

(19)

A program for causing a computer to execute processing including:

measuring, on the basis of an output signal from a radar, a distance and relative velocity of a reflector that reflects a transmission signal from the radar, and performing folding correction of measured velocity of the reflector on the basis of correlation between a measured distance and measured velocity of the reflector at a certain measurement time, and a measured distance and measured velocity of the reflector at a time before the measurement time.

(20)

An information processing device including:

a measurement unit that measures, on the basis of an output signal from a radar, a distance, relative velocity, and direction of a reflector that reflects a transmission signal from the radar;

a correction unit that performs folding correction of measured velocity of the reflector on the basis of correlation between a measured distance and measured velocity of the reflector at a certain measurement time, and a measured distance and measured velocity of the reflector at a time before the measurement time; and an object sensing unit that senses an object on the basis of a measured distance, corrected measured velocity, and measurement direction of the reflector, and supplies a subsequent stage with a result of sensing the object.

Note that the effects described herein are only examples, and the effects of the present technology are not limited to these effects. Additional effects may also be obtained.

REFERENCE SIGNS LIST

10 Vehicle
100 Vehicle control system
102 Data acquisition unit
141 Vehicle exterior information detection unit
201 Camera
202 Millimeter-wave radar
211 Information processing unit
221 Signal processing unit
222 Object sensing unit
223 Signal processing unit
224 Object sensing unit
225 Tracking unit
251 Calibration unit
252 Measurement unit
253 Correction unit
261 Distance computation unit
262 Velocity computation unit
263 Noise removal unit
264 Direction estimation unit

The invention claimed is:

1. A signal processing device, comprising:
a central processing unit (CPU) configured to:
acquire an output signal from a radar;
measure, based on the acquired output signal, each of a first distance of a reflector and a first relative velocity of the reflector, wherein
the reflector reflects a transmission signal from the radar, and
each of the first distance and the first relative velocity is measured at a first measurement time of the transmission signal;
acquire each of a second distance of the reflector and a second relative velocity of the reflector, wherein
each of the second distance and the second relative velocity is associated with a second measurement time of the transmission signal, and
the second measurement time is before the first measurement time;
change a first number of times of a measured velocity folding of the reflector based on a plurality of numbers of times of the measured velocity folding, wherein the plurality of numbers of times of the measured velocity folding includes the first number of times of the measured velocity folding and a second number of times of the measured velocity folding;
predict a third distance, of the reflector, for each number of the plurality of numbers of times of the measured velocity folding based on each of:
the change of the first number of times of the measured velocity folding,
the second distance of the reflector, and
the second relative velocity of the reflector;
compare the predicted third distance and the measured first distance;
estimate the second number of times of the measured velocity folding based on the comparison of the predicted third distance and the measured first distance; and
correct the measured first relative velocity of the reflector based on the estimated second number of times of the measured velocity folding.

2. The signal processing device according to claim 1, wherein the CPU is further configured to:
measure a plurality of first distances of a plurality of reflectors, wherein
the plurality of reflectors includes the reflector
the plurality of reflectors corresponds to a same object, and
the plurality of first distances includes the first distance of the reflector;
predict a plurality of third distances of the plurality of reflectors, wherein the plurality of third distances includes the predicted third distance;
compare the predicted plurality of third distances and the measured plurality of first distances;
estimate the second number of times of the measured velocity folding of the plurality of reflectors based on the comparison of the predicted plurality of third distances and the measured plurality of first distances; and correct the measured first relative velocity of the plurality of reflectors based on the estimated second number of times of the measured velocity folding.

3. The signal processing device according to claim 1, wherein the CPU is further configured to:
measure a direction of the reflector;
correct the second relative velocity of the reflector based on the measured direction; and
predict the third correction unit predicts a distance, of the reflector, for each number of the plurality of numbers of times of the measured velocity folding based on the corrected second relative velocity of the reflector.

4. The signal processing device according to claim 1, wherein the CPU is further configured to:
execute, on the acquired output signal, each of a range fast Fourier transform (FFT) process and a Doppler FFT process; and
measure each of the first distance of the reflector and the first relative velocity of the reflector based on the execution of each of the range FFT process and the Doppler FFT process.

5. The signal processing device according to claim 4, wherein the CPU is further configured to:
obtain an FFT signal based on the execution of each of the range FFT process and the Doppler FFT process;
remove a noise from the FFT signal; and
measure a direction of the reflector based on the FFT signal from which the noise is removed.

6. The signal processing device according to claim 5, wherein
the CPU is further configured to remove the noise from the FFT signal based on attenuation of a component of the FFT signal, and
the component has an intensity less than a determined intensity of the FFT signal.

7. The signal processing device according to claim 1, wherein the CPU is further configured to:
calibrate the acquired output signal; and
measure each of the first distance and the first relative velocity based on the calibrated output signal.

8. The signal processing device according to claim 7, wherein the CPU is further configured to:
obtain an average signal of the acquired output signal; and
determine a difference between the acquired output signal and the average signal of the acquired output signal.

9. The signal processing device according to claim 1, wherein
the CPU is further configured to measure the first distance and the first relative velocity for a first frame of a plurality of frames, and
each frame of the plurality of frames includes a plurality of chirp signals.

10. The signal processing device according to claim 9, wherein
the transmission signal includes a signal, and
the signal includes a chirp signal, of the plurality of chirp signals, of a specific type that is repeated.

11. The signal processing device according to claim 9, wherein
the plurality of frames includes the first frame and a second frame,
the second frame is one frame before the first frame,
each of the first distance of the reflector and the first relative velocity of the reflector is associated with the first frame,
each of the second distance of the reflector and the second relative velocity of the reflector is associated with the second frame, and
the CPU is further configured to correct the first relative velocity of the reflector based on a correlation between:
the first distance and the first relative velocity, and
the second distance and the second relative velocity.

12. The signal processing device according to claim 11, wherein
the plurality of frames further includes a third frame,
the third frame is two frames before the first frame,
the CPU is further configured to correct the first relative velocity of the reflector based on a correlation between:
the first distance and the first relative velocity, and
a fourth distance of the reflector and a third relative velocity of the reflector, and
each of the fourth distance and the third relative velocity is associated with each of the second frame and the third frame.

13. The signal processing device according to claim 1, wherein the CPU is further configured to:
correct the second relative velocity of the reflector; and
correct the first relative velocity of the reflector based on the corrected second relative velocity.

14. The signal processing device according to claim 1, wherein the radar includes a millimeter-wave radar.

15. The signal processing device according to claim 1, wherein the reflector is around a mobile object.

16. The signal processing device according to claim 1, wherein the measured velocity folding occurs in a case where an absolute value of the first relative velocity of the reflector exceeds a determined maximum measurement velocity.

17. A signal processing method, comprising:
acquiring an output signal from a radar;
measuring, based on the acquired output signal, each of a first distance of a reflector and a first relative velocity of the reflector, wherein
the reflector reflects a transmission signal from the radar, and
each of the first distance and the first relative velocity is measured at a first measurement time of the transmission signal;
acquiring each of a second distance of the reflector and a second relative velocity of the reflector, wherein
each of the second distance and the second relative velocity is associated with a second measurement time of the transmission signal, and
the second measurement time is before the first measurement time;
changing a first number of times of a measured velocity folding of the reflector based on a plurality of numbers of times of the measured velocity folding, wherein the plurality of numbers of times of the measured velocity folding includes the first number of times of the measured velocity folding and a second number of times of the measured velocity folding;
predicting a third distance, of the reflector, for each number of the plurality of numbers of times of the measured velocity folding based on each of:
the change of the first number of times of the measured velocity folding,
the second distance of the reflector, and
the second relative velocity of the reflector;
comparing the predicted third distance and the measured first distance;

estimating the second number of times of the measured velocity folding based on the comparison of the predicted third distance and the measured first distance; and correcting the measured first relative velocity based on the estimated second number of times of the measured velocity folding.

18. A non-transitory computer-readable medium having stored thereon computer-executable instructions that, when executed by a computer, cause the computer to execute operations, the operations comprising:

acquiring an output signal from a radar;

measuring, based on the acquired output signal, each of a first distance of a reflector and a first relative velocity of the reflector, wherein
the reflector reflects a transmission signal from the radar, and
each of the first distance and the first relative velocity is measured at a first measurement time of the transmission signal;

acquiring each of a second distance of the reflector and a second relative velocity of the reflector, wherein
each of the second distance and the second relative velocity is associated with a second measurement time of the transmission signal, and
the second measurement time is before the first measurement time;

changing a first number of times of a measured velocity folding of the reflector based on a plurality of numbers of times of the measured velocity folding, wherein the plurality of numbers of times of the measured velocity folding includes the first number of times of the measured velocity folding and a second number of times of the measured velocity folding;

predicting a third distance, of the reflector, for each number of the plurality of numbers of times of the measured velocity folding based on each of:
the change of the first number of times of the measured velocity folding,
the second distance of the reflector, and
the second relative velocity of the reflector;

comparing the predicted third distance and the measured first distance;

estimating the second number of times of the measured velocity folding based on the comparison of the predicted third distance and the measured first distance; and correcting the measured first relative velocity based on the estimated second number of times of the measured velocity folding.

19. An information processing device, comprising:
a central processing unit (CPU) configured to:
acquire an output signal from a radar;
measure, based on the acquired output signal, each of:
a first distance of a reflector,
a first relative velocity of the reflector, and
a direction of the reflector, wherein
the reflector reflects a transmission signal from the radar, and
each of the first distance and the first relative velocity is measured at a first measurement time of the transmission signal;
acquire each of a second distance of the reflector and a second relative velocity of the reflector, wherein
each of the second distance and the second relative velocity is associated with a second measurement time of the transmission signal, and
the second measurement time is before the first measurement time;
change a first number of times of a measured velocity folding of the reflector based on a plurality of numbers of times of the measured velocity folding, wherein the plurality of numbers of times of the measured velocity folding includes the first number of times of the measured velocity folding and a second number of times of the measured velocity folding;
predict a third distance, of the reflector, for each number of the plurality of numbers of times of the measured velocity folding based on each of:
the change of the first number of times of the measured velocity folding,
the second distance of the reflector, and
the second relative velocity of the reflector;
compare the predicted third distance and the measured first distance;
estimate the second number of times of the measured velocity folding based on the comparison of the predicted third distance and the measured first distance; and
correct the measured first relative velocity of the reflector based on the estimated second number of times of the measured velocity folding; and
an object sensing unit configured to:
sense an object based on each of the measured first distance, the corrected first relative velocity, and the measured direction; and
output a result of the sensed object.

* * * * *